US011950086B2

(12) United States Patent
Bosnjak et al.

(10) Patent No.: US 11,950,086 B2
(45) Date of Patent: Apr. 2, 2024

(54) APPLICATIONS AND FORMAT FOR IMMERSIVE SPATIAL SOUND

(71) Applicant: MACH 1, CORP., New York, NY (US)

(72) Inventors: Drazen Bosnjak, New York, NY (US); Dylan J. Marcus, New York, NY (US)

(73) Assignee: MACH 1, CORP., New York, NY (US)

( * ) Notice: Subject to any disclaimer, the term of this patent is extended or adjusted under 35 U.S.C. 154(b) by 0 days.

(21) Appl. No.: 17/568,256

(22) Filed: Jan. 4, 2022

(65) Prior Publication Data

US 2022/0201420 A1 Jun. 23, 2022

Related U.S. Application Data

(63) Continuation of application No. 16/544,343, filed on Aug. 19, 2019, now Pat. No. 11,218,830, which is a (Continued)

(51) Int. Cl.

*H04S 7/00* (2006.01)
*H04R 5/033* (2006.01)
*H04R 5/04* (2006.01)

(52) U.S. Cl.

CPC ............. *H04S 7/304* (2013.01); *H04R 5/033* (2013.01); *H04R 5/04* (2013.01); *H04S 7/303* (2013.01);

(Continued)

(58) Field of Classification Search

CPC ........... H04R 5/033; H04R 5/04; H04S 7/304; H04S 7/303; H04S 2400/01; H04S 2400/11; H04S 2420/01

See application file for complete search history.

(56) References Cited

U.S. PATENT DOCUMENTS 7,333,622 B2 2/2008 Algazi et al.
8,574,075 B2 11/2013 Dickins (Continued)

FOREIGN PATENT DOCUMENTS

CN 103905945 7/2014
WO 2014001478 1/2014

OTHER PUBLICATIONS

3D Sound Labs, 3D Sound One—The World's First Smart 3D Audio Headphones! pp. 1-5 (Jul. 2015) http://3dsoundlabs.com/en/.

(Continued)

*Primary Examiner* — Andrew L Sniezek
(74) *Attorney, Agent, or Firm* — VOLPE KOENIG

(57) ABSTRACT

Methods, systems, and apparatuses are disclosed for generating a spatial audio format. An input audio source may include one or more individual channels. The one or more individual channels may be designated to be played by a corresponding one or more speakers. The one or more individual channels of the audio source may be separated. The one or more individual tracks may be input into a modeling space representing a multi-dimensional space. The modeling space may include a plurality of emitters at various locations in a vector space. Each of the one or more individual channels may be panned to one or more of the plurality of emitters. The panning may be based on a normalized proximity of the one or more individual channels in the modeling space to the plurality of emitters. The one or more of the plurality of emitters may be encoded into a single multichannel file.

20 Claims, 17 Drawing Sheets

Related U.S. Application Data continuation of application No. 15/967,795, filed on May 1, 2018, now Pat. No. 10,390,169, which is a continuation of application No. 15/449,700, filed on Mar. 3, 2017, now Pat. No. 9,986,363.

(60) Provisional application No. 62/303,184, filed on Mar. 3, 2016.

(52) U.S. Cl.
CPC ....... *H04S 2400/01* (2013.01); *H04S 2400/11* (2013.01); *H04S 2420/01* (2013.01)

(56) References Cited

U.S. PATENT DOCUMENTS

| | | | |
|---|---|---|---|
| 8,767,968 B2 | 7/2014 | Flaks et al. | |
| 8,831,255 B2 | 9/2014 | Crawford et al. | |
| 9,237,398 B1 | 1/2016 | Algazi et al. | |
| 9,986,363 B2 | 5/2018 | Bosnjak et al. | |
| 10,390,169 B2 | 8/2019 | Bosnjak et al. | |
| 11,218,830 B2 * | 1/2022 | Bosnjak | H04R 5/04 |
| 2003/0031334 A1 | 2/2003 | Layton et al. | |
| 2011/0206209 A1 | 8/2011 | Ojaia | |
| 2013/0064375 A1 | 3/2013 | Atkins et al. | |
| 2013/0243201 A1 | 9/2013 | Algazi et al. | |
| 2014/0205270 A1 | 7/2014 | Kelly et al. | |
| 2015/0230040 A1 | 8/2015 | Squires et al. | |
| 2016/0212272 A1 | 7/2016 | Srinivasan et al. | |
| 2017/0078825 A1 | 3/2017 | Mangiat et al. | |
| 2017/0208416 A1 | 7/2017 | Petrov | |
| 2018/0068664 A1 | 3/2018 | Seo | |
| 2018/0210695 A1 | 7/2018 | Tsingos | |
| 2018/0268831 A1 | 9/2018 | Villemoes | |
| 2018/0332421 A1 | 11/2018 | Torres | |

OTHER PUBLICATIONS

Wired, "What is Hooke?" Hooke Audio—Wireless 3d Audio Headphones with Built-in Binaural Microphones, pp. 1-8 (Jun. 2015), http://www.hookeaudio.com/.
Bose, "Bose Introducers Audio Augmented Reality Platform," pp. 1-2, Available at: https://globalpressroom.bose.com/us-en/pressrelease/view/1905 (Mar. 9, 2018).
Bose Ventures, "Bose Ventures is Investing in the Bose AR Platform," pp. 1-9 (2018). https://bose.ventures.

* cited by examiner

Stereo Output Regions

| | | | |
|---|---|---|---|
| Top 270 | Top 000 | Top 090 | Top 180 |
| Bottom 270 | Bottom 000 | Bottom 090 | Bottom 180 |

APPLICATIONS AND FORMAT FOR IMMERSIVE SPATIAL SOUND

CROSS REFERENCE TO RELATED APPLICATIONS

This application is a continuation of U.S. patent application Ser. No. 16/544,343, filed on Aug. 19, 2019, which issued on Jan. 4, 2022 as U.S. Pat. No. 11,218,830, which is a continuation of U.S. patent application Ser. No. 15/967,795, filed on May 1, 2018, which issued on Aug. 20, 2019 as U.S. Pat. No. 10,390,169, which is a continuation of U.S. patent application Ser. No. 15/449,700 filed on Mar. 3, 2017, which issued on May 29, 2018 as U.S. Pat. No. 9,986,363, which claims the benefit of U.S. Provisional Application No. 62/303,184 filed on Mar. 3, 2016, which are incorporated by reference as if fully set forth.

BACKGROUND

Embodiments described herein relate generally to spatial audio, and more particularly to the generation and processing of realistic audio based on a user's orientation and positioning to a source of audio located in reality, virtual reality, or augmented reality. Spatial audio signals are being used in greater frequency to produce a more immersive audio experience. A stereo or multi-channel recording may be passed from a recording apparatus to a listening apparatus and may be replayed using a suitable multi-channel output, such as a multi-channel speaker arrangement or with virtual surround processing in stereo headphones or a headset.

Typically, spatial audio is produced for headphones using binaural processing to create the impression that a sound source is at a specific 3D location. Binaural processing may mimic how natural sound waves are detected and processed by humans. For example, depending on where a sound originates, it may arrive at one ear before the other (i.e., interaural time difference ("ITD")), it may be louder at one ear than the other (i.e., interaural level Difference ("ILD")), and it may bounce and reflect with specific spectral cues. Binaural processing may use head-related transfer function ("HRTF") filters to model the ITD, ILD, and spectral cues separately at each ear, process the audio, and then play the audio through two-channel headphones. Binaural processing may involve rendering the same sounds twice: once for each ear.

To measure HRTFs, a human subject, or analog, may be placed in a special chamber designed to prevent sound from reflecting off the walls. Speakers may be placed at a fixed distance from the subject in various directions. Sound may be played from each speaker in turn and recordings may be made using microphones placed in each of the subject's ears.

SUMMARY

Methods, systems, and apparatuses are disclosed for generating a spatial audio format. An audio source may be received as an input. The audio source may include one or more individual channels. The one or more individual channels may be designated to be played by a corresponding one or more speakers. The one or more individual channels of the audio source may be separated. The one or more individual tracks may be input into a modeling space representing a multi-dimensional space. The modeling space may include a plurality of emitters at various locations in a vector space. Each of the one or more individual channels may be panned to one or more of the plurality of emitters. The panning may be based on a normalized proximity of the one or more individual channels in the modeling space to the plurality of emitters. The one or more of the plurality of emitters may be encoded into a single multichannel file.

DETAILED DESCRIPTION

Figure 1:
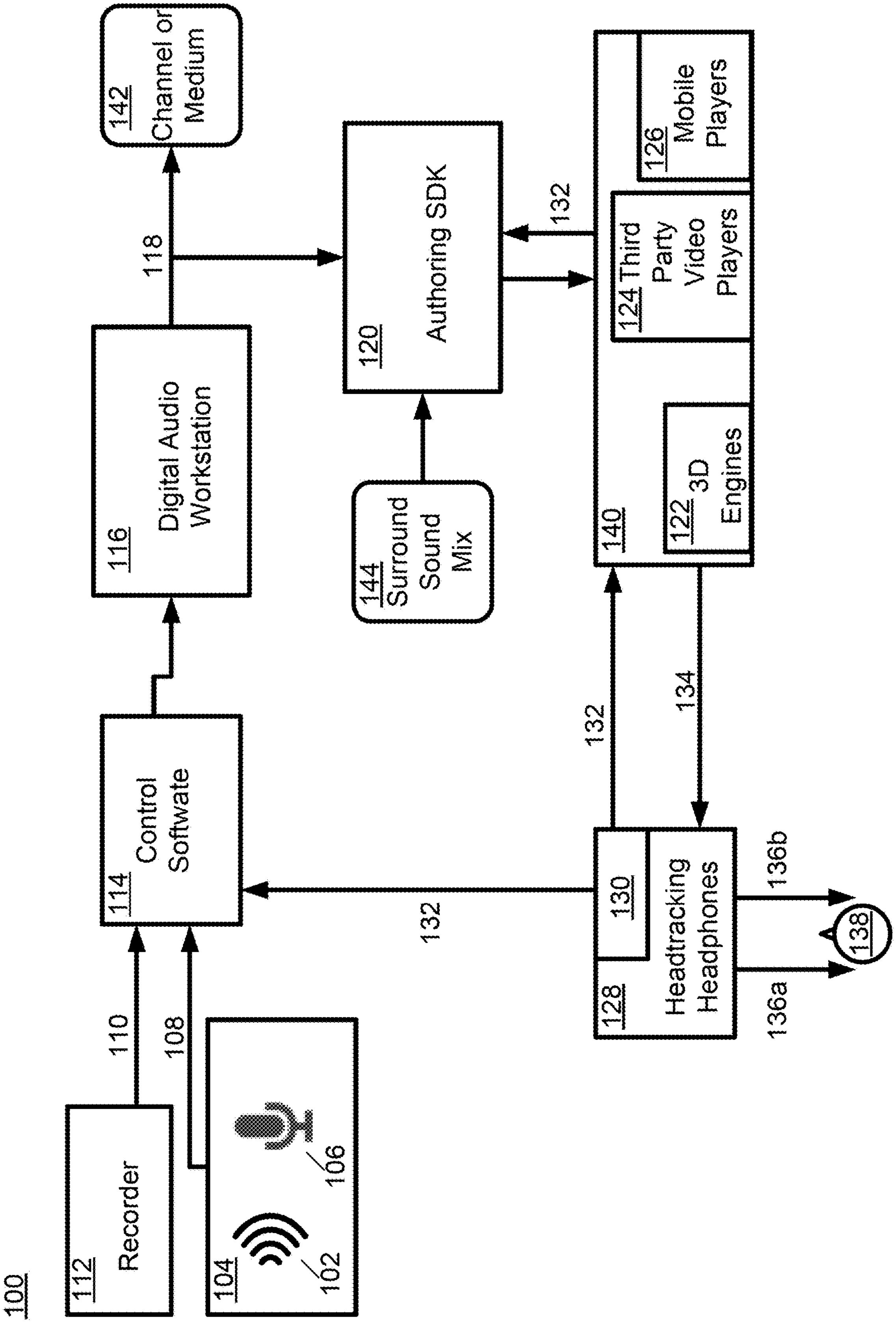
FIG. 1 is a system-level overview of a production-end system for encoding, transmitting, and reproducing spatial audio.

Conventional methods of producing spatial audio (e.g., for augmented reality (AR), virtual reality (VR), or 360 degree spherical video) may involve mixing the audio during initial recording and then having a third party application or an audio engine render the audio using additional mixing, filtering, and processing to impose directionality during rendering or playback.

This process may have a number of drawbacks in producing spatial audio for the above applications. For example, the audio played back during rendering may not be sonically similar to the original mix. The additional mixing, filtering, and processing may be destructive to the sound quality and may undermine a user's efforts to create sonically superior mixes (e.g., techniques mastered for cinema content over the last century). Furthermore, the user may have little to no control over defining directionality for sounds since all sound are typically processed before playback. This may limit the amount of creativity and control a user may have over an audio mix. In addition, active processing and filtering during playback may add latency to the audio. This is may be unacceptable for audio in VII projects, where latency is very noticeable and detrimental to the users' experience.

Embodiments described herein may enable a custom surround sound configuration to be created and virtually simulated using user orientation data, control software, and specific audio routing. The same configuration may later be unwrapped and routed for playback, without active processing or filtering, when deployed on any target device using the same routing scheme and logic. This may ensure that the mix an audio professional hears in the studio is exactly deployed to the user. Unlike conventional methods, this process may not require any additional processing or filtering to the audio during playback, therefore reducing or eliminating latency issues.

Embodiments described herein may include a set of studio workflow tools, which may one or more standalone applications and plugins for digital audio workstations (DAWs), that allow an audio engineer/professional to mix audio using their own workflow style, gear, and design. The audio engineer/professional may not need to learn or adapt to an additional layer of object oriented sound or other formats that require levels of processing added to the user's playback.

Embodiments described herein may include the processing of audio signals, which is to say signals representing physical sound (i.e., continuous variations in air pressure). These audio signals may be analog waveforms analogous to the variations in air pressure of the original sound, or analog waveforms transformed into digital electronic signals. Accordingly, embodiments may operate in the context of a time series of digital bytes or words, said bytes or words forming a discrete approximation of an analog signal or (ultimately) a physical sound. The discrete, digital signal may correspond to a digital representation of a periodically sampled audio waveform.

As is known in the art, the waveform may be sampled at a rate at least sufficient to satisfy the Nyquist sampling theorem for the frequencies of interest. For example, in an embodiment, a sampling rate of approximately 44.1 thousand samples/second may be used. Higher oversampling rates such as 96 kHz may alternatively be used. The quantization scheme and bit resolution may be chosen to satisfy the requirements of a particular application, according to principles well known in the art. The techniques and apparatuses described herein may be applied interdependently in a number of channels. For example, the embodiments may be used in stereo headphones or, alternatively, in a "surround" audio system (having more than two channels).

As used herein, a "digital audio signal" or "audio signal" does not describe a mere mathematical abstraction, but instead denotes information encoded in, embodied in, or carried by a physical medium capable of detection by a machine or apparatus. This term includes recorded or transmitted signals, and should be understood to include conveyance by any form of encoding, including, but not limited to, pulse code modulation (PCM). Outputs or inputs, or indeed intermediate audio signals could be encoded or compressed by any of various known methods, including MPEG, ATRAC, AC3, or DTS. Some modifications may be required to accommodate that particular compression or encoding method, as will be apparent to those with skill in the art.

As used herein, "transmitting" or "transmitting through a channel" may include any method of transporting, storing, or recording data for playback which might occur at a different time or place, including but not limited to electronic transmission, optical transmission, satellite relay, wired or wireless communication, transmission over a data network such as the internet or LAN or WAN, recording on durable media such as magnetic, optical, or other form (including DVD, "Blu-ray" disc, or the like). In this regard, recording for either transport, archiving, or intermediate storage may be considered an instance of transmission through a channel.

Referring now to FIG. 1, a system-level overview of a production-end system 100 for encoding, transmitting, and reproducing spatial audio in accordance with one or more embodiments is shown. The system 100 may simulate 3D environments and user interactivity within any studio environment to allow a user 138 to monitor a target audio mix in real time.

In an embodiment, physical sounds 102 may emanate in an acoustic environment 104, and may be converted into digital audio signals 108 by a multi-channel microphone apparatus 106. It will be understood that some arrangement of microphones, analog to digital converters, amplifiers, and encoding apparatus may be used in known configurations to produce digitized audio. Alternatively, or in addition to live audio, analog or digitally recorded audio data ("tracks") 110 can supply the input audio data, as symbolized by recording device 112. The audio tracks may be in any analog or digital format that is conventionally used in the art. Conventional plugin software may be used in the signal processing of the audio tracks. Such plugin software formats may include, AAX/RTAS format, AU format, and VST/VST3 format.

In an embodiment, the audio sources 108 and/or 110 may be captured in a substantially "dry" form: in other words, in a relatively non-reverberant environment, or as a direct sound without significant echoes. The captured audio sources are generally referred to as "stems." Alternatively, the stems may be mixed with other signals recorded "live" in a location providing good spatial impression.

The audio sources 108 and/or 110 may be input into control software 114. The control software 114 may be procedures or a series of actions when considered in the context of a processor based implementation. It is known in the art of digital signal processing to carry out mixing, filtering, and other operations by operating sequentially on strings of audio data. Accordingly, one with skill in the art will recognize how to implement the various procedures by programming in a symbolic language such as C or C++, which can then be implemented on a specific processor platform.

As discussed in more detail below, the control software 114 may use orientation and position data 132, which may be provided by headtracking headphones 128, to process and adjust the audio sources 108 and/or 110.

Figure 2:
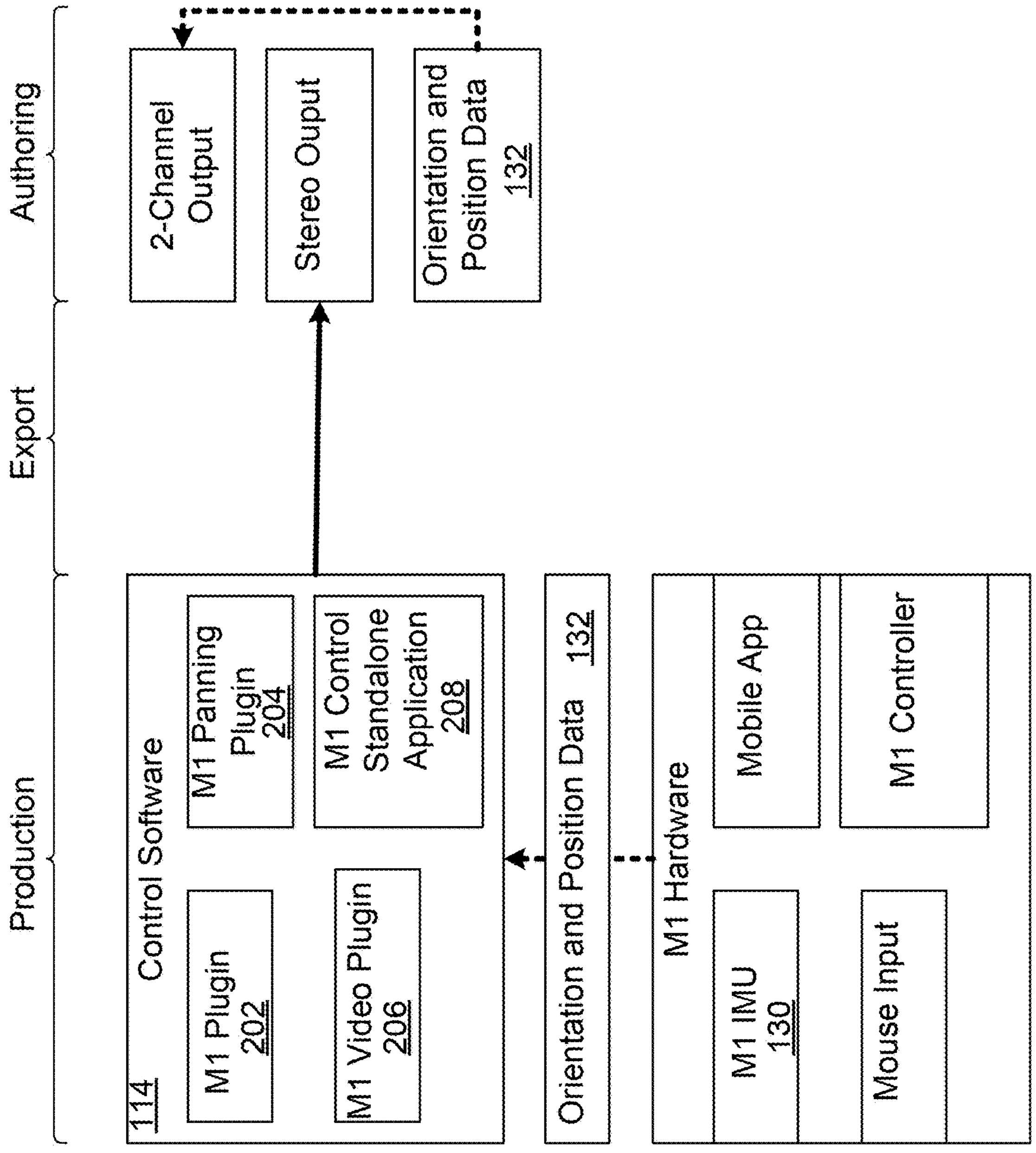
FIG. 2 is a diagram illustrating elements of control software.

Referring now to FIG. 2, a diagram illustrating elements of the control software 114 is shown. The control software 114 may include one or more plugins for processing the audio sources 108 and/or 110, allowing for the routing of individual audio tracks and/or busses to create spatial sound. The control software may be used in a production stage in which 3D environments may be simulated. Audio professionals may interact with the simulated 3D environments and monitor their target mix in real time. The control software 114 may be connected to a DAW (not shown). The control software 114 may export mulitrack audio that is wrapped into a single file to an authoring stage.

The control software 114 may include a M1 plugin 202. The M1 plugin 202 may conduct authoring/decoding of audio to be monitored under constraints similar to target devices. The M1 plugin 202 may receive the orientation and position data 132 and may impart an orientation to the audio through routing, which may be described in additional detail below. The M1 plugin 202 may allow for the import of features of omnidirectional sound mixes/sources to the routing scheme.

The control software 114 may include a M1 panning plugin 204 that may be placed on any track. The M1 panning plugin 204 may break the track apart into mono input (MI)

emitters that may be moved around in a modeling space. If horizontal, vertical, and tilt orientating audio is required, the MI emitters may be moved around (giving them x,y,z coordinates) within a cube representing a three dimensional space. Based on the MI emitters' positions, they may route percentages of its gain based to eight vertex emitters based on its proximity to the vertices of a cube. The vertex emitters may represent virtual speakers. For horizontal, vertical, and tilt orientating audio, the vertex emitters may then be output to eight separate mono bus outputs that may be then input to a M1 routing portion of software to be routed, as described below. For horizontal orienting audio, fewer mono bus outputs may be used. It should be noted that additional mono bus outputs may be used. These output formats may be referred to as "M1 Horizon Format" for only horizontal orientating audio and "M1 Spatial Format" for horizontal, vertical, and tilt orientating audio.

The control software 114 may include a M1 video plugin 206. The M1 video plugin 206 may be used to monitor VR video content, which may include wrapped 360 degree audio taken from monoscopic or stereoscopic sources. The orientation and position data 132 may control a composite of unwrapped video based on user 138 orientation.

The control software may include a M1 control standalone application 208. The M1 control standalone application 208 may simulate control of the DAW from an external source using the orientation and position data 132.

Figure 3:
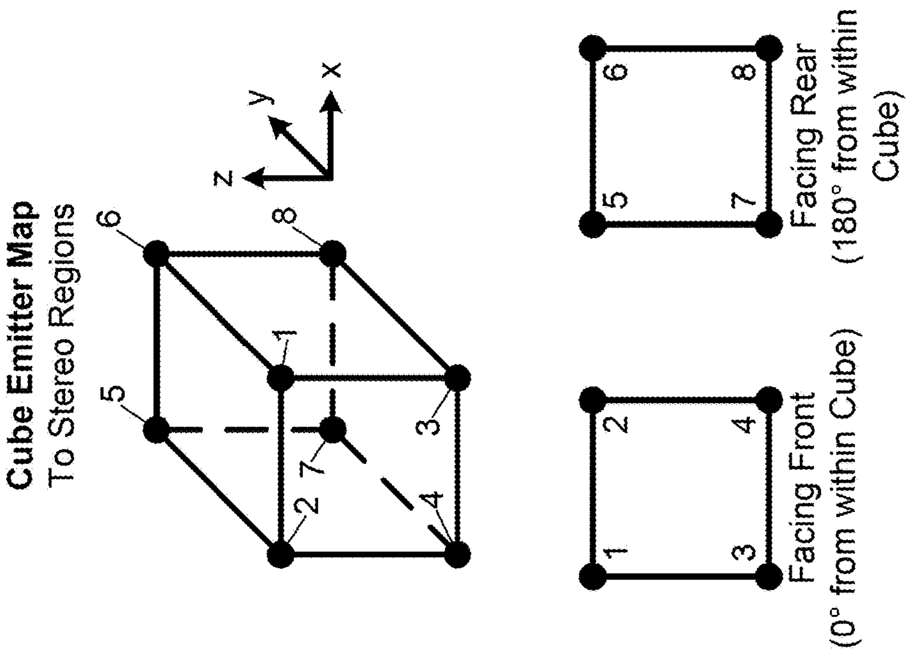
FIGS. 3 and 4 are diagrams of modeling spaces with cube emitter maps.
Figure 3:
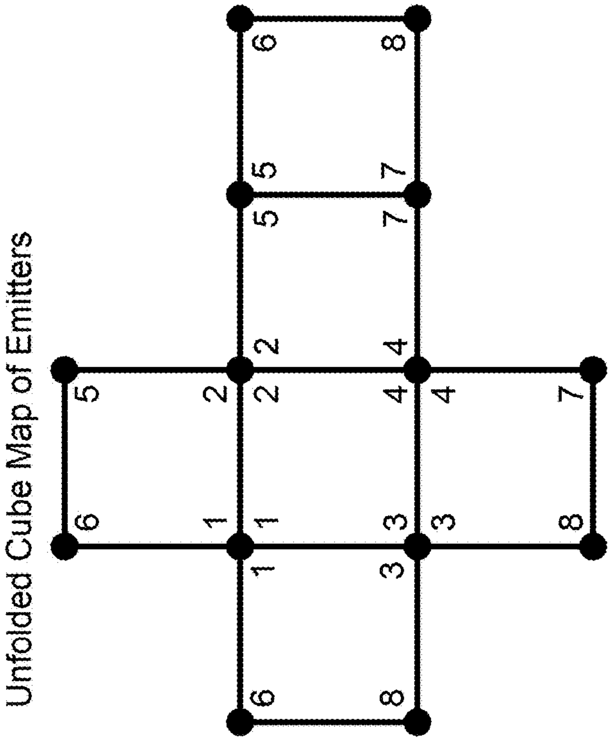
Figure 4:
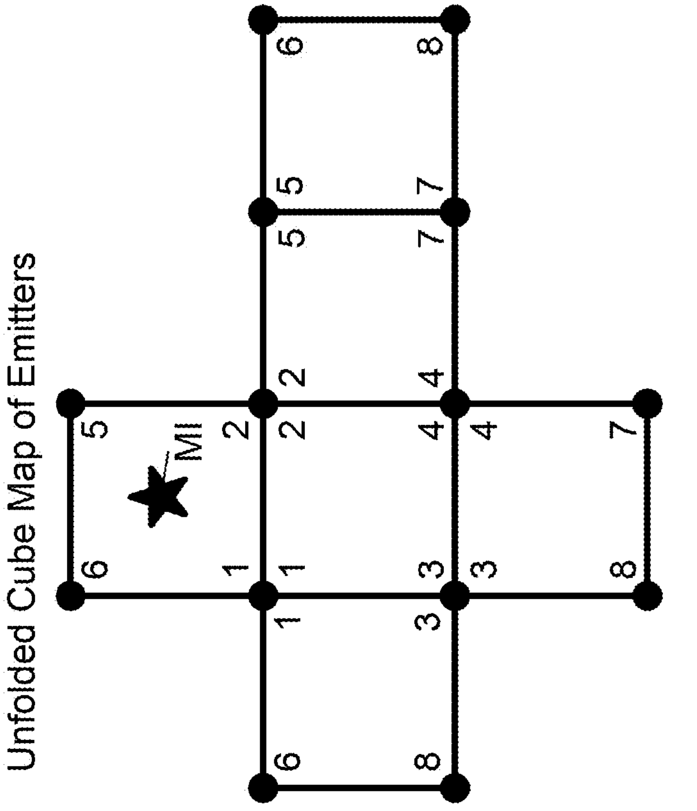
Figure 4:
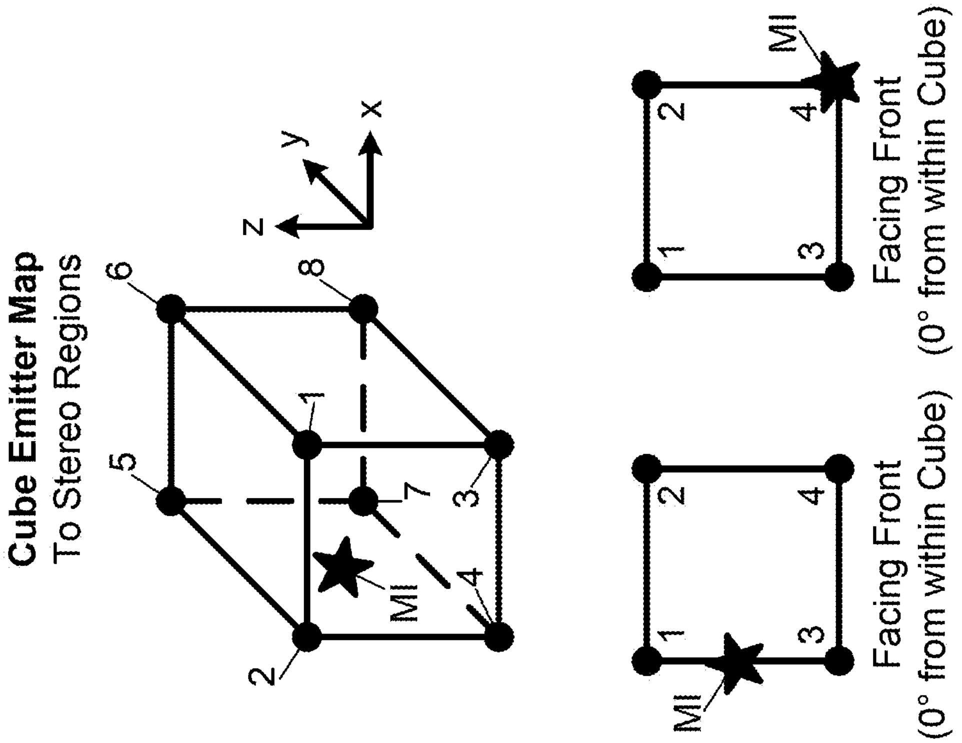

Referring now to FIGS. 3 and 4, diagrams of modeling spaces with cube emitter maps are shown. To create a center gain within the cube, the total sum may be divided by all vertices (8). In other words, this may be equivalent to giving 12.5% of gain equally to each of the vertices. While on a face of the cube, the sum of the gain may be shared by the 4 vertices that make that face. While on a line between two vertices of the cube, the gain may be summed from the two vertices making that line. While on a vertex of the cube, the sum of the gain may be 100% of that single vertex.

There may be crossfade between stereo output regions. For example, when looking directly in the center of 000, the output sound should have 50% of Top 000 and 50% of Bottom 000. When looking 45° up at 180, the output sound should have 75% of Top 180 and 25% of Bottom 180.

As shown in FIG. 4, when a MI emitter is within a cube, it may send gain to all 8 vertex emitters, the level of which may vary based on the MI emitter's proximity to each of the eight vertex emitters. For example, as the MI emitter approaches vertex emitter 6 from the center of the cube, then that that vertex emitter will receive a higher percentage of gain than the other vertex emitters. If the MI emitter is placed in the center of the cube than all eight vertex emitters may each receive 12.5% of the distributed gain of the MI emitter's signal.

If a MI emitter is hard panned so that it is on a face of the cube then that MI emitter may send a distributed signal to the four vertex emitters that make up that cube face. The percentage of gain sent to the four vertex emitters may be distributed based on their proximity to the MI emitter.

For example, after maxing out the z coordinate of a MI emitter in the cube, it may be within the top (6,5,1,2) plane. If the MI emitter remains in the center of that plane, it may distribute 25% of its gain to each of the four vertex emitters (6,5,1,2). If the MI emitter is incremented along the x axis (i.e., moving it toward vertex emitters 5 and 2), then vertex emitters 5 and 2 may receive a higher gain distribution percentage and vertex emitters 6 and 1 may receive a lower gain distribution percentage.

If the MI emitter is panned so that it is on an edge of the cube, it may distribute its gain to the two vertex emitters on that edge based on its proximity to either vertex emitter. If the MI emitter is panned directly onto a vertex emitter, that vertex emitter receives 100% of the distributed gain of the MI emitter. The other seven vertex emitters may receive 0% of the distributed gain from the MI emitter.

In an embodiment, instead of using a virtual cube, a multi-order diamond configuration may be used to model the routing. The multi-order diamond configuration may be a cube with a 2-sided 3D cone on the top and bottom of the cube.

If only horizontal orientating audio is required, the routing may be performed in a quad (4.0) surround mix environment. As described above, this format may be referred to the "M1 Horizon Format" after it has been encoded.

Figure 5:
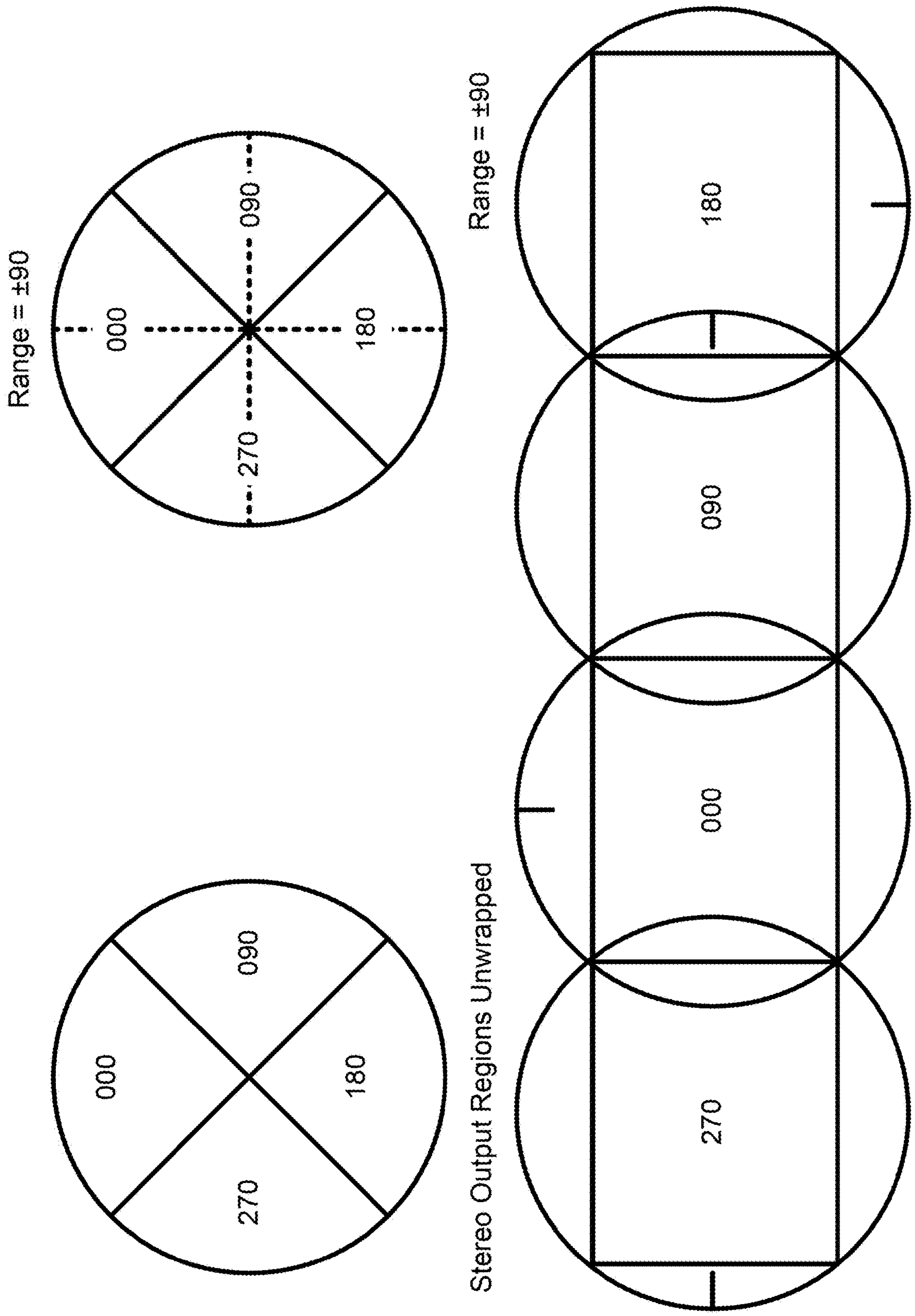
FIG. 5 is a diagram of stereo output regions for horizontal audio using quad (4.0) surround.

Referring now to FIG. 5, stereo output regions for horizontal audio using quad (4.0) surround is shown. Range ±90 may refer to the falloff distance in degrees from a center of that region's location for the audio from that region to be heard at 0% volume. The horizontal orientation sphere may be further subdivided by n. However, it may be required to divide 360° by n to compensate for the range and have a consistently even orientation environment.

Figure 6A:
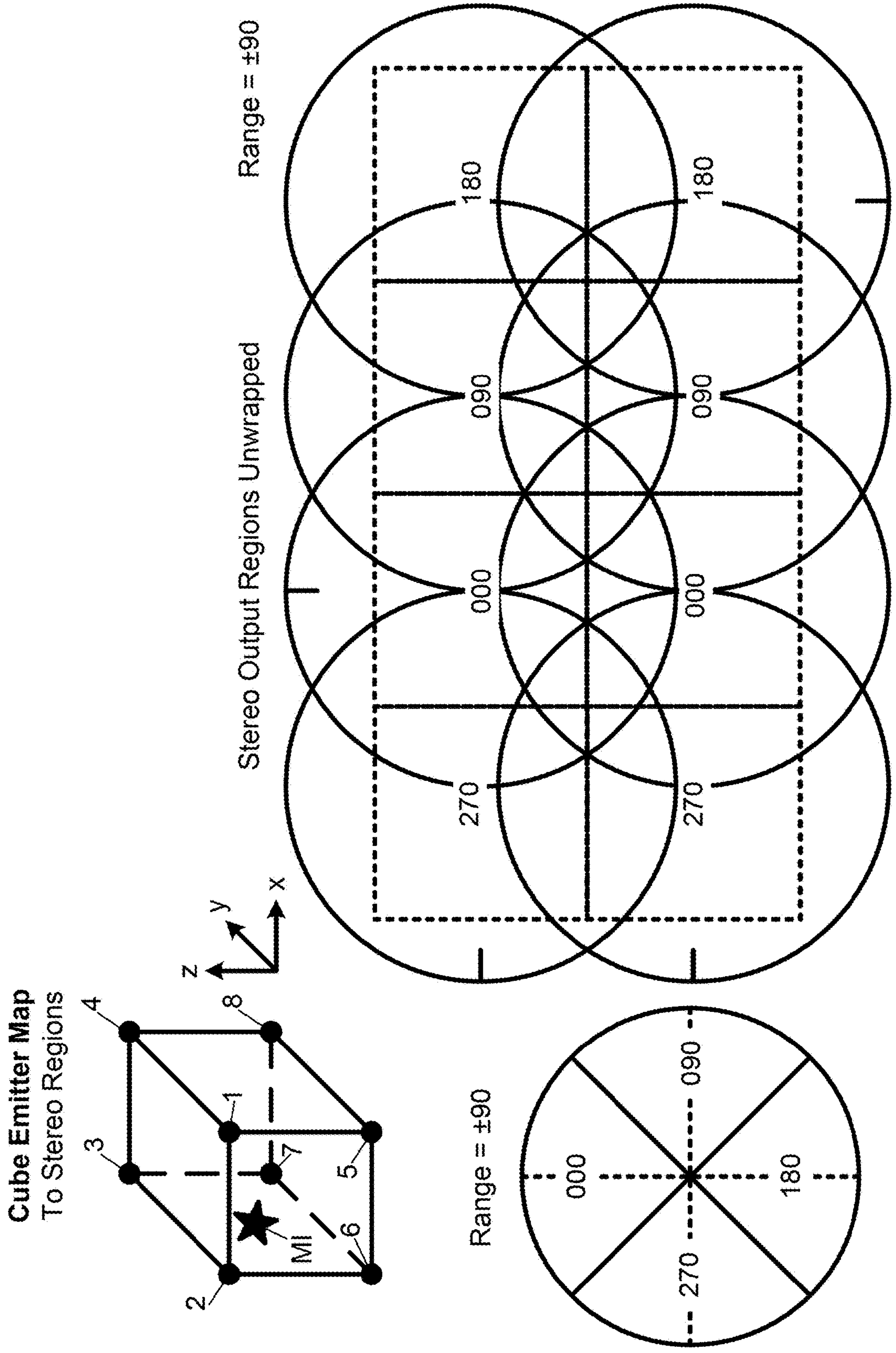
FIGS. 6A and 6B are diagrams illustrating periphonic yaw-pitch-roll (YPR) decoding.
Figure 6B:
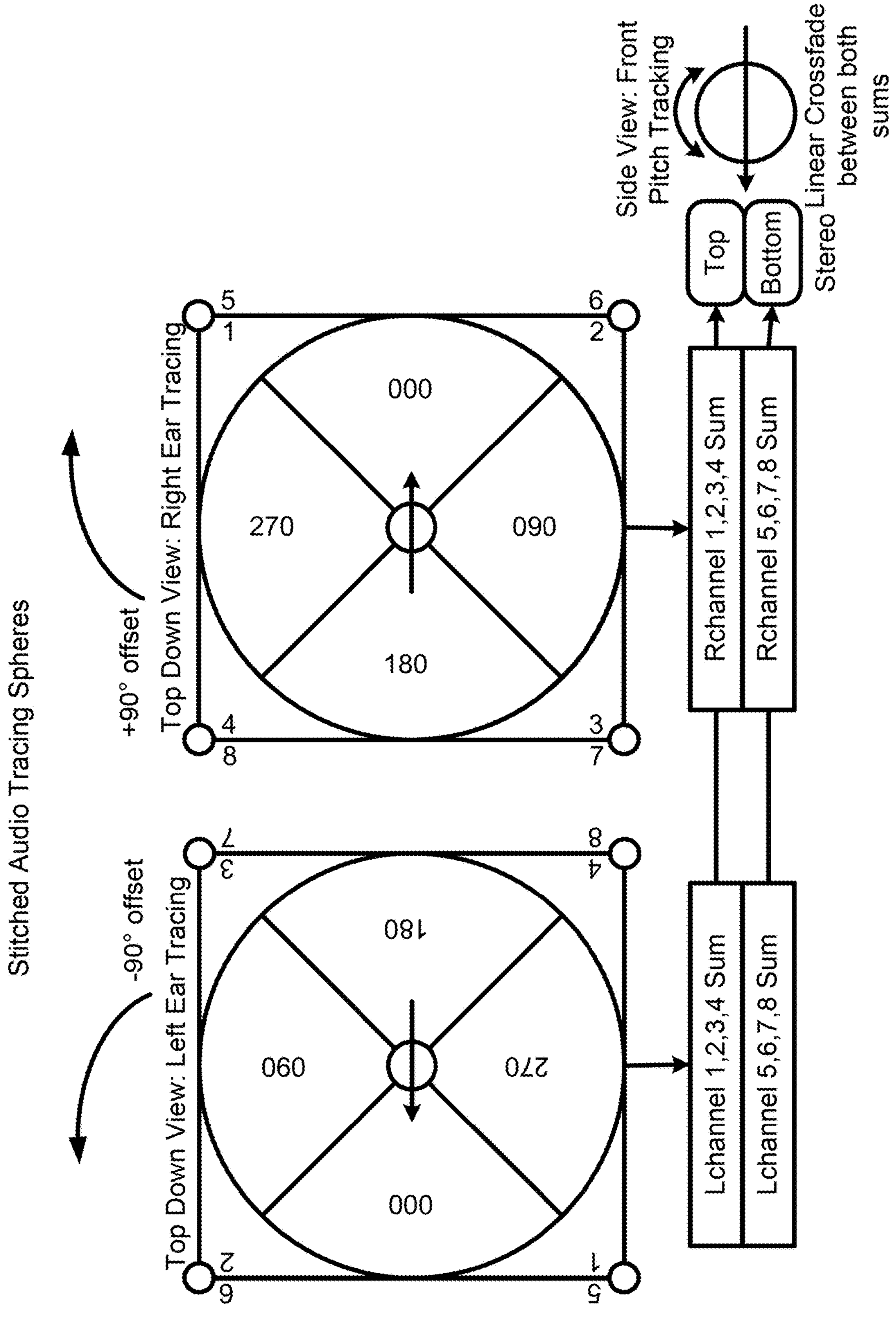

Referring now to FIGS. 6A-6B, diagrams illustrating periphonic yaw-pitch-roll (YPR) decoding are shown. In an embodiment, decoding during the M1 orientation mixer may involve decoding audio to stereo based on the yaw and pitch from the orientation and position data 132. In another embodiment, user head tilt input from the orientation and position data 132 may be used to change coefficient multipliers to audio buffers during decoding. As the user's head tilts from left to right, and vice versa, the perceived audio may shift from low elevated and high elevated encoded audio.

As described above, when a MI emitter is within a cube, it may send gain to all 8 vertex emitters, the level of which may vary based on the MI emitter's proximity to each of the eight vertices (emitters). For example, as the MI emitter approaches vertex emitter 6 from the center of the cube, then that that vertex emitter will receive a higher percentage of gain than the other vertex emitters, which will receive a lower percentage of gain. This may be based on the quadraphonic proximity effect, which is known in the art. If the MI emitter is placed in the center of the cube than all eight vertices (emitters) may each receive 12.5% of the distributed gain of the MI emitter's signal.

Audio from the cube may be routed into a 8×2 Stereo Output Regions mapping, as shown in FIG. 6A. Range ±90 may refer to the falloff distance in degrees from a center of that region's location for the audio from that region to be heard at 0% volume.

From the Stereo Output Regions mapping, the audio may be split by, for example, a determinant matrix, into two stitched audio tracing spheres with 8×1 channels each as shown in FIG. 6B. The Left Ear Tracing may determine the orientation mixing and sum for channel 1 stereo output. The Right Ear Tracing may determine the orientation mixing and sum for channel 2 stereo output.

Table 1 and Table 2 illustrate coding which may be used to calculate the volume of the vertices of the cube (i.e., eight channels) with yaw and pitch as described above, and the addition of tilt/roll information. In an embodiment, this may be done by inverse multiplying a mix of the top vertices and bottom vertices by a tilt coefficient corresponding to the tilt/roll of the user's head.

The coefficients may be calculated from the orientation data 132, which may be provided by any device that has orientation sensors. The coefficients may be calculated from the Euler angles outputted from the orientation sensors. In an embodiment, the orientation data 132 may include quaternion orientation data and may be converted into Euler anglers using the following functions:

$$rollEuler=a\tan 2(2.0^*(y^*z+w^*x),w^*w-x^*x-y^*y+z^*z); \quad \text{Equation(1)}$$

$$pitchEuler=a\sin(-2.0^*(x^*z-w^*y)); \quad \text{Equation (2)}$$

$$yawEuler=a\tan 2(2.0^*(x^*y+w^*z),w^*w+x^*x-y^*y-z^*z); \quad \text{Equation (3)}$$

where the variables x, y, and z are three-dimensional coordinates.

The following processing may be performed on the samples of sound, and may determine levels for the channels, which may be dictated by the user's head orientation. The coefficients may be applied directly to newly routed input channels. Even numbered channels may be applied the output left coefficient and odd numbered channels may be applied to the output right coefficient for decoding to stereo output,

TABLE 1

Calculating Spatial Sound for M1 Spatial (Isotropic) Audio Using Yaw, Pitch, and Roll

```
#ifndef DEG_TO_RAD
#define DEG_TO_RAD (PI/180.0)
#endif
struct mPoint {
  float x, y, z;
  mPoint( ) {
    x = 0;
    y = 0;
    z = 0;
  }
  mPoint(float X, float Y, float Z) {
    x = X;
    y = Y;
    z = Z;
  }
  mPoint(float X, float Y) {
    x = X;
    y = Y;
    z = 0;
  }
  inline mPoint operator+( const mPoint& pnt ) const {
    return mPoint( x+pnt.x, y+pnt.y, z+pnt.z );
  }
  inline mPoint operator*( const float f) const {
    return mPoint( x*f, y*f, z*f );
  }
  inline mPoint operator*( const mPoint& vec ) const {
    return mPoint( x*vec.x, y*vec.y, z*vec.z );
  }
  inline mPoint operator-( const mPoint& vec ) const {
    return mPoint( x-vec.x, y-vec.y, z-vec.z );
  }
  inline float length( ) const {
    return (float)sqrt( x*x + y*y + z*z );
  }
  float operator[ ](int index) {
    float arr[3]= {x, y, z};
    return arr[index];
  }
  inline mPoint& rotate( float angle, const mPoint& axis) {
    mPoint ax = axis.getNormalized( );
    float a = (float)(angle*DEG_TO_RAD);
    float sina = sin( a );
    float cosa = cos( a );
    float cosb = 1.0f - cosa;
    float nx = x*(ax.x*ax.x*cosb + cosa) +
    y*(ax.x*ax.y*cosb − ax.z*sina) +
```

TABLE 1-continued

Calculating Spatial Sound for M1 Spatial (Isotropic) Audio Using Yaw, Pitch, and Roll

```
    z*(ax.x*ax.z*cosb + ax.y*sina);
    float ny = x*(ax.y*ax.x*cosb + ax.z*sina) +
    y*(ax.y*ax.y*cosb + cosa) +
    z*(ax.y*ax.z*cosb − ax.x*sina);
    float nz = x*(ax.z*ax.x*cosb − ax.y*sina) +
    y*(ax.z*ax.y*cosb + ax.x*sina) +
    z*(ax.z*ax.z*cosb + cosa);
    x = nx; y = ny; z = nz;
    return *this;
  }
  inline mPoint& normalize( ) {
    float length = (float)sqrt(x*x + y*y + z*z);
    if( length > 0) {
      x /= length;
      y /= length;
      z /= length;
    }
    return *this;
  }
inline mPoint getNormalized( ) const {
    float length = (float)sqrt(x*x + y*y + z*z);
    if( length > 0) {
      return mPoint( x/length, y/length, z/length );
    } else {
      return mPoint( );
    }
  }
inline mPoint getRotated( float angle, const mPoint& axis) const {
    mPoint ax = axis.getNormalized( );
    float a = (float)(angle*DEG_TO_RAD);
    float sina = sin( a );
    float cosa = cos( a );
    float cosb = 1.0f - cosa;
    return mPoint( x*(ax.x*ax.x*cosb + cosa) +
      y*(ax.x*ax.y*cosb − ax.z*sina) +
      z*(ax.x*ax.z*cosb + ax.y*sina),
      x*(ax.y*ax.x*cosb + ax.z*sina) +
      y*(ax.y*ax.y*cosb + cosa) +
      z*(ax.y*ax.z*cosb − ax.x*sina),
      x*(ax.z*ax.x*cosb − ax.y*sina) +
      y*(ax.z*ax.y*cosb + ax.x*sina) +
      z*(ax.z*ax.z*cosb + cosa) );
  }
};
static float mDegToRad(float degrees) {
  return degrees * DEG_TO_RAD;
}
static std::vector<float>eightChannelsIsotropicAlgorithm(float Yaw,
float Pitch, float Roll) {
  mPoint simulationAngles = mPoint(Yaw, Pitch, Roll);
  mPoint faceVector1 = mPoint( cos(mDegToRad
(simulationAngles[1])),
                sin(mDegToRad(simulationAngles[1]))).
normalize( );
  mPoint faceVector2 = faceVector1.getRotated(simulationAngles[0],
                          mPoint(cos(mDegToRad
(simulationAngles[1] − 90)),
                              sin(mDegToRad(simulationAngles
[1] − 90))) .normalize( ));
  mPoint faceVector21 = faceVectorl.getRotated(simulationAngles
[0] + 90,
                          mPoint(cos(mDegToRad
(simulationAngles[1] − 90)),
                              sin(mDegToRad
(simulationAngles[1] − 90))) .normalize( ));
  mPoint faceVectorLeft = faceVector21.getRotated
(-simulationAngles[2] − 90, faceVector2);
  mPoint faceVectorRight = faceVector21.getRotated
(-simulationAngles[2] + 90, faceVector2);
  mPoint faceVectorOffsetted =
mPoint(cos(mDegToRad(simulationAngles[1])),
sin(mDegToRad(simulationAngles[1]))).normalize( ).rotate(
                                      simulationAngles[0] + 10,
mPoint(cos(mDegToRad(simulationAngles[1] − 90)),
sin(mDegToRad(simulationAngles[1] − 90))).
normalize( )) - faceVector2;
  mPoint tiltSphereRotated = faceVectorOffsetted.rotate(-
```

TABLE 1-continued

Calculating Spatial Sound for M1 Spatial (Isotropic) Audio Using Yaw, Pitch, and Roll

```
simulationAngles[2], faceVector2);
  // Drawing another 8 dots
  mPoint points[8] =
  {  mPoint(100, −100, −100),
     mPoint(100, 100, −100),
     mPoint(−100, −100, −100),
     mPoint(−100, 100, −100),
     mPoint(100, −100, 100),
     mPoint(100, 100, 100),
     mPoint(−100, −100, 100),
     mPoint(−100, 100, 100)
  };
  float qL[8];
  for (int i = 0; i <8; i++) {
     qL[i] = (faceVectorLeft * 100 + faceVector2 * 100 -
points[i]).length( );
  }
  float qR[8];
  for (int i = 0; i <8; i++) {
     qR[i]= (faceVectorRight * 100 + faceVector2 * 100 -
points[i]).1ength( );
  }
  std::vector<float>result;
  result.resize(16);
  for (int i = 0; i<8; i++) {
     float vL = clamp(mmap(qL[i]* 2, 250, 400, 1., 0.), 0, 1) / 2;
     float vR = damp(mmap(qR[i]* 2, 250, 400, 1., 0.), 0, 1) / 2;
     result[i * 2] = vR;
     result[i * 2 + 1] = vL;
  }
  return result;
}
```

Alternatively, the samples of sound may be decoded with an emphasis on the yaw delta of the user, which may be referred to as a periphonic alternative. The periphonic alternative may allow for the output of the decoding to be packaged into 8 stereo pairs for more mastering control when combining non-diegetic (i.e., sound that does not emanate from characters on a screen, such as narrator comments, sounds effects, and music score) and diegetic audio (i.e., sound that emanates from characters and elements visible on screen). Even numbered channels may be applied to the output left coefficient and all odd numbered channels are applied to the output right coefficient for decoding to stereo output.

TABLE 2

Calculating Spatial Sound for M1 Spatial (Periphonic) Audio Using Yaw, Pitch, and Roll

```
static std::vector<float> eightChannelsAlgorithm(float Yaw,
float Pitch, float Roll)
{
  //Orientation input safety clamps/alignment
  Pitch = alignAngle(Pitch, −180, 180);
  Pitch = clamp(Pitch, −90, 90); // −90, 90
  Yaw = alignAngle(Yaw, 0, 360);
  Roll = alignAngle(Roll, −180, 180);
  Roll = clamp(Roll, −90, 90); // −90, 90
  float coefficients [8];
  coefficients[0] = 1. - std::min(1., std::min((float)360. - Yaw, Yaw)
/ 90.);
  coefficients[1] = 1. - std::min(1., std::abs((float)90. - Yaw) / 90.);
  coefficients[2] = 1. - std::min(1., std::abs((float)180. - Yaw) / 90.);
  coefficients[3] = 1. - std::min(1., std::abs((float)270. - Yaw) / 90.);
  float tiltAngle = mmap(Roll, −90., 90., 0., 1., true);
  //Use Equal Power if engine requires
  /*
  float tiltHigh = cos(tiltAngle * (0.5 * PI));
  float tiltLow = cos((1.0 - tiltAngle) * (0.5 * PI));
```

TABLE 2-continued

Calculating Spatial Sound for M1 Spatial (Periphonic) Audio Using Yaw, Pitch, and Roll

```
  */
  float tiltHigh = tiltAngle;
  float tiltLow = 1. - tiltHigh;
  //ISSUE//
  //Able to kill stereo by making both pitch and tilt at max or min
values together without proper clamps
  std::vector<float>result;
  result.resize(16);
  result[0] = coefficients[0] * tiltHigh * 2.0; // 1 left
  result[1] = coefficients[3] * tiltHigh * 2.0; // right
  result[2] = coefficients[1] * tiltLow * 2.0; // 2 left
  result[3] = coefficients[0] * tiltLow * 2.0; // right
  result[4] = coefficients[3] * tiltLow * 2.0; // 3 left
  result[5] = coefficients[2] * tiltLow * 2.0; // right
  result[6] = coefficients[2] * tiltHigh * 2.0; // 4 left
  result[7] = coefficients[1] * tiltHigh * 2.0; // right
  result[0 +8] = coefficients[0] * tiltLow * 2.0; // 1 left
  result[l + 8] = coefficients[3] * tiltLow * 2.0; // right
  result[2 +8] = coefficients[1] * tiltHigh * 2.0; // 2 left
  result[3 +8] = coefficients[0] * tiltHigh * 2.0; // right
  result[4 +8] = coefficients[3] * tiltHigh * 2.0; // 3 left
  result[5 +8] = coefficients[2] * tiltHigh * 2.0; // right
  result[6 +8] = coefficients[2] * tiltLow * 2.0; // 4 left
  result[7 +8] = coefficients[1] * tiltLow * 2.0; // right
  float pitchAngle = mmap(Pitch, 90., −90., O., 1., true);
  //Use Equal Power if engine requires
  /*
  float pitchHigherHalf = cos(pitchAngle * (0.5*PI));
  float pitchLowerHalf = cos((1.0 - pitchAngle) * (0.5*PI));
  */
  float pitchHigherHalf = pitchAngle;
  float pitchLowerHalf = 1. - pitchHigherHalf;
  for (int i = 0; i<8; i++) 1
     result[i]* = pitchLowerHalf;
     result[i + 8]* = pitchHigherHalf;
  }
  return result;
}
```

As shown above in Table 1 and Table 2, audio from the 8 input channels (i.e., the vertices) may be input. In the M1 orientation mixer, an orientation angle for horizontal/yaw head movement, an orientation angle for vertical/pitch head movement, and an orientation angle for tilt/roll head movement may be converted to a Euler angle and may be used to calculate the horizontal/yaw, vertical/pitch, and tilt/roll coefficients. These coefficients may then be applied to the 8 input channels of the cube with ±90 degree ranges. The M1 orientation mixer may provide the logic/math behind the mixing of the "virtual" stereo pairs that are arranged by the M1 routing process block.

The M1 orientation mixer may set up and apply coefficient multipliers based on the vertical/pitch orientation angle for the top 4 inputs (i.e., vertices) and bottom 4 inputs (i.e., vertices) of the cube configuration. The M1 orientation mixer may also set up a coefficient multiplier based on the tilt/roll orientation angle multiplier for output to the user's left and right ears.

A M1 routing matrix may combine and assign channels for output, based on the input channels adjusted by the coefficient multipliers, to the user's left ear and right ear based around the listener. The M1 routing matrix may apply the tilt/roll multiplier to all 8 input channels. The M1 routing matrix may ensure that all summed output audio/gain does not deviate from the summed input audio/gain.

Table 3 illustrates a process which may be used to calculate the volume of horizontal audio (i.e., 4 channels) with yaw input from the position data 132. In this format (M1 Horizon Format) there may be no vertical or tilt calculation.

TABLE 3

Calculating Spatial Sound for 4 M1 Horizon Audio Using Yaw

```
static std::vector<float>fourChannelAlgorithm
  (float Yaw, float Pitch, float Roll) {
  //Orientation input safety clamps/alignment
  Yaw = alignAngle(Yaw, 0, 360);
  float coefficients [4];
  coefficients[0] = 1. - std::min(1., std::min((float)360. - Yaw, Yaw)
  / 90.);
  coefficients[1] = 1. - std::min(1., std::abs((float)90. - Yaw) / 90.);
  coefficients[2] = 1. - std::min(1., std::abs((float)180. - Yaw) / 90.);
  coefficients[3] = 1. - std::min(1., std::abs((float)270. - Yaw) / 90.);
  std::vector<float>result;
  result.resize(8);
  result[0] = coefficients[0]; // 1 left
  result[1] = coefficients[3]; // right
  result[2] = coefficients[1]; // 2 left
  result[3] = coefficients[0]; // right
  result[4] = coefficients[3]; // 3 left
  result[5] = coefficients[2]; // right
  result[6] = coefficients[2]; // 4 left
  result[7] = coefficients[1]; // right
  return result;
    }
```

As shown above in Table 3, audio from the 4 input channels may be inputted. In the M1 orientation mixer, an orientation angle for horizontal/yaw head movement may be converted to an Euler angle and may be used to calculate the horizontal coefficient. The horizontal coefficient may then be applied to the 4 input channels of the square with ±90 degree ranges. The M1 routing matrix may then take the input channels, double them, and assign them to the appropriate ears. This may allow the horizontal stereo field to be maintained.

The control software 114 may also include a M1 routing process block and a standalone control application. After the M1 panning plugin 204 distributes the gain of the MI emitter to the simulated speakers to create the multiple mono busses, the mono busses may be input to the M1 routing process block. The M1 routing process block may route the mono busses to create and simulate stereo regions that are cross-faded based on listener orientation.

Table 4 shows how to create a Virtual Vector Based Panning (VVBP) decoding of a stereo (2 channel) audio input. This may be performed by attaching an outputted Mid ('m') coefficient to a position in a 3D space for spatialization against the Side ('s') coefficient which is directly applied to the output stereo channels. This process may be referred to as M1 StereoSpatialize (M1 StSP) and may be best implemented in 3D software engines.

TABLE 4

Calculating Spatial Sound for M1 StereoSourcePoint (StSP) Audio

```
float *l = buffer.getWritePointer(0);
     float *r = buffer.getWritePointer(1);
     int length = buffer.getNumSamples( );
     float *m = l;
     float *s = r;
     for (int i = 0; i <length; i ++) {
  if (gainMid ! = −1.0) {
//M1 True Mid/Side Encoding Math
       //m[i] = gainMid * ((l[i] − s[i]) + (r[i] − s[i])) /2;
//Common Mid/Side Encoding Math
       m[i] = gainMid * (1[i] + r[i]) /2;
       }
     if (gainSide ! = −1.0) {
          s[i] = gainSide * (1[i] − r[i]) / 2;
          }
     }
```

TABLE 4-continued

Calculating Spatial Sound for M1 StereoSourcePoint (StSP) Audio

```
  const int totalNumInputChannels = getTotalNumInputChannels( );
  const int totalNumOutputChannels = getTotalNumOutputChannels( );
     float spatialize = getParameter(0);
     float panL = cos(spatialize * (0.5 * float_Pi));
     float panR = cos((1.0 − spatialize) * (0.5 * float_Pi));
```

The M1 routing process block may work with the M1 panning plugin 204 and may allow the eight mono busses described above (i.e., vertex emitters 1-8) to be routed to a single surround sound audio track and rearranged into "virtual" stereo pairs. The surround sound audio track may be a quad (4.0), 5.1, or cube (7.1) surround sound audio track. Table 5 may be a routing track for quad (4.0) surround.

TABLE 5

Routing Track for Quad (4.0) Surround

| 4.0 Surround | L | R | Ls | Rs |
|---|---|---|---|---|
| Input CH 1 | X | | | |
| Input CH 2 | | X | | |
| Input CH 3 | | | X | |
| Input CH 4 | | | | X |
| Output Pair 1 | L | R | | |
| Output Pair 2 | | L | | R |
| Output Pair 3 | | | R | L |
| Output Pair 4 | R | | L | |

Table 6 may be a routing track for 5.1 surround.

TABLE 6

Routing Track for 5 1 Surround

| 5.1 Surround | L | C | R | Ls | Rs | LFE |
|---|---|---|---|---|---|---|
| Input CH 1 | X | | | | | |
| Input CH 2 | | X | | | | |
| Input CH 3 | | | X | | | |
| Input CH 4 | | | | X | | |
| Input CH 5 | | | | | X | |
| Input CH 6 | | | | | | X |
| Output Pair 1 | L | | R | | | |
| Output Pair 2 | | | L | | R | |
| Output Pair 3 | | | | R | L | |
| Output Pair 4 | R | | | L | | |
| Output Pair 5 (Omni Stereo) | | L | | | | R |

If the surround sound audio track is 7.1 surround, it may be routed into eight stereo pairs based on a stereo routing map. Table 7 may be a routing track for cube (7.1) surround.

TABLE 7

Routing Map for cube (7.1) surround

| 7.1 Surround | L | C | R | Lss | Rss | Lsr | Rsr | LFE | Region of Cube |
|---|---|---|---|---|---|---|---|---|---|
| Input CH 1 | X | | | | | | | | |
| Input CH 2 | | X | | | | | | | |
| Input CH 3 | | | X | | | | | | |
| Input CH 4 | | | | X | | | | | |
| Input CH 5 | | | | | X | | | | |
| Input CH 6 | | | | | | X | | | |
| Input CH 7 | | | | | | | X | | |
| Input CH 8 | | | | | | | | X | |
| Output Pair 1 | L | R | | | | | | | T000 |

TABLE 7-continued

Routing Map for cube (7.1) surround

| 7.1 Surround | L | C | R | Lss | Rss | Lsr | Rsr | LFE | Region of Cube |
|---|---|---|---|---|---|---|---|---|---|
| Output Pair 2 | | L | | R | | | | | T090 |
| Output Pair 3 | | | R | L | | | | | T180 |
| Output Pair 4 | R | | L | | | | | | T270 |
| Output Pair 5 | | | | | L | R | | | B000 |
| Output Pair 6 | | | | | | L | | R | B090 |
| Output Pair 7 | | | | | | | R | L | B180 |
| Output Pair 8 | | | | | R | | L | | B270 |

After being routed into the eight stereo output pairs, the M1 routing process block may receive the orientation and position data 132 to properly crossfade between the stereo output pairs and downmix that to a stereo output (e.g., headphones or physical speakers) for monitoring purposes. In an embodiment, the orientation data 132 may be received from a mouse, a software application, or a Musical Instrument Digital Interface (MIDI). In an embodiment, the orientation data 132 may be received from a M1 controller. The M1 controller may be a hardware controller that includes a slider for pitch simulation and an encoder for yaw simulation. The M1 may also include buttons for degree presets (e.g., 0°, 90°, 180°, and 270°) and buttons for transport and feature controls. In an embodiment, the M1 controller may be hardcoded for Human User Interface (HUI) protocol to control a conventional MIDI platform. In another embodiment, as described below, the orientation data 132 may be received from any head-mounted display (HMD) or an inertial measurement unit (IMU) 130 coupled to a HMD or headtracking headphones 128 that can track a user's head movements.

The M1 routing process block may allow for the bussing of an additional stereo output pair (inputted separately) that gets routed universally to all stereo output pairs. The M1 routing process block may enable vertical (pitch) tracking/control to be turned on or off. The M1 routing process block may enable a user to snap orientation degree presets with keystrokes.

In an embodiment, the control software 114 may be a standalone application configured to run on a computing device that is coupled to a Digital Audio Workstation (DAW) 116. In another embodiment, the control software 114 may be integrated into the DAW 116 itself. The DAW 116 may be an electronic device or computer software application for recording, editing and producing audio files such as songs, musical pieces, human speech or sound effects. In an embodiment, the DAW 116 may be a software program configured to run on a computer device, an integrated stand-alone unit, or a configuration of numerous components controlled by a central computer.

The DAW 116 may have a central interface that allows the user 138 to alter and mix multiple recordings and tracks into a final produced piece. The central interface may allow the user to control individual "engines" within the DAW 116. This terminology refers to any programmable or otherwise configured set of electronic logical and/or arithmetic signal processing functions that are programmed or configured to perform the specific functions described. Alternatively, field programmable gate arrays (FPGAs), programmable Digital signal processors (DSPs), specialized application specific integrated circuits (ASICs), or other equivalent circuits could be employed in the realization of any of the "engines" or subprocesses, without departing from the scope of the invention.

The DAW 116 may allow a user to control multiple tracks and/or busses simultaneously. The DAW 116 may allow the user 138 to monitor the process of routing the decoded signals from the M1 panning plugin 204, which are summed distributed audio based on the mix, to create a series of stereo multichannel tracks. The series of stereo multichannel tracks may be crossfaded based on the orientation and position data 132 to create a masking effect and preserve stereo directionality.

After the audio sources 108 and/or 110 are mixed using the control software 114 and the DAW 116, the multiple layers and tracks may be wrapped into a single export file 118. The export file 118 may be a multitrack audio file. For example, the export file 118 may be a 4.0 surround sound format, a 5.1 surround sound format, or a 7.1 surround sound format. It should be noted that because the export file 118 may contain audio tracks coded with routing information, the audio mix may not sound correct, even if played on conventional speaker configurations, without decoding.

In order for the user 138 to monitor and adjust the mixing during the production process, the export file 118 may be transmitted to an authoring software development kit (SDK) 120. The authoring SDK 120 may replicate the functions of the M1 routing process block, as described above, in various scripts that can be recreated and implemented into a target device or application. The authoring SDK 120 may decode the export file 118 and may route the multiple audio tracks that are layered within the export file 118 into enabled applications 140 for playback. Examples of enabled applications 140 may include 3D video engines 122, third party video players 124, and mobile players 126.

The enabled applications 140 may be coupled to headtracking headphones 128. The headtracking headphones 128 may include a pair of high fidelity headphones packaged with an inertial measurement unit (IMU) 130. The IMU 130 may include a microcontroller operatively coupled to a rechargeable power source and position sensors that track a user's head movements in real-time. In an embodiment, the position sensors may include an accelerometer, a magnetometer, and a gyroscope. The IMU 130 may be able to track any movement of the user's head, such as the pitch, yaw, roll angles, acceleration, elevation, etc.

The IMU 130 may be contained within the pair of high fidelity headphones or may be self-contained in an attachable enclosure that may be affixed to conventional over-the-ear headphones. The microcontroller of the IMU 130 may be operatively coupled to a transceiver that allows the IMU 130 to connect and send the headtracking measurements gathered by the motion sensors as orientation and position data 132. The measurements may be transmitted by, for example, a wireless connection using an IEEE 802.11 protocol, a Bluetooth® connection, or a USB serial connection.

The orientation and position data 132 may be transmitted to the enabled applications 140. The enabled applications 140 may use the orientation and position data 132 in combination with routing schemes contained within the authoring SDK 120 to decode user orientation and create high quality interactive multichannel biphonic audio 134 to the high fidelity headphones without any additional processing or filtering.

Using routing algorithms included in the authoring SDK 120, the user can input any number of audio channels from the export file 118 into software which will properly route and decode an interactive multichannel biphonic audio mix to the headphones. The authoring allows any customizable amount of channels that route audio based on orientation and positioning while maintaining the same consistency without destruction of mixed audio input.

The M1 routing process block and the authoring SDK 120 may use one or more algorithms to author and decode an n-channel input, such as the export file 118, as an interactive multichannel biphonic stereo mix for headphones based on user's orientation and positioning. The orientation and position data 132 may be used to "place" a user as a MI emitter within the modeling areas created by the panning plugin 204 and the optimum audio mix for that location may be routed by the M1 routing process block and authoring SDK 120 to user.

An example of an algorithm that may looped and applied to each stereo channel in order to determine the mix of all the channels based on a user's orientation is as follows:

$$\text{If } (IMUDeg > CnDeg - 90) \text{ and } (IMUDeg < CnDeg + 90) \quad \text{Equation (4)}$$

$$\text{then } CnVol = 1.0 - \frac{|IMUDeg - CnDeg|}{90};$$

$$\text{else } CnVol = 0.0,$$

where IMUDeg is the degree of orientation, CnDeg is the stereo channel's preassigned degree, and CnVol is the stereo channel's current volume. The algorithm above may adapt to any number of inputs. For example, any number of channels with any number of positions/ranges per channel can be set up around a listener, thereby creating a sphere of influence from the center of each channel where range equals the radius of the sphere. The center of the sphere may deliver 100% of that channel and this value may decrease towards the radius of the sphere.

In an embodiment, the enabled applications 140 may be coupled to a head-mounted display (HMD). The enabled applications 140 and the authoring SDK 120 may use orientation data from the HMD as orientation and position data 132 for use in the authoring and routing as described above.

The enabled applications 140 may then transmit a biphonic audio mix 134 to the headtracking headphones 128 using any conventional medium, such as, for example a 3.5 mm audio jack, a lightning connector, a wireless IEEE 802.11 protocol, a Bluetooth® connection, or a USB serial connection. The biphonic audio mix 134 may be received by the headtracking headphones 128 and converted into physical sound using two or more electro-dynamic drivers (e.g., miniature speakers). In an embodiment, the headtracking headphones 128 may deliver sound to a left ear of the user 138 through a left channel **136*a* and to a right ear of the user 138 through a right channel 136*b***.

Unlike conventional binaural methods, which process a single audio mix on the fly and send the processed sound to each ear, the biphonic audio mix 134 may be established in a production studio. The audio channels may be duplicated for each ear on separate stereo channels **136*a* and 136*b*** to ensure the stereo field is preserved. This arrangement may be more ideal for audio engineers, which may retain more control over the final sound, and may reduce or eliminate latency issues.

The control software 114 and the authoring SDK 120 may be controlled by the same IMU 130 and may receive the same orientation and position data 132. The headtracking headphones 128 may also transmit the position data 132 to the control software 114. Based this orientation and position data 132 and the sound delivered from the headtracking headphones 128, the user 138 may readjust the mix of the audio sources 108 and/or 110 using the control software 114 and the DAW 116. The control software 114 and plugins may perform the same authoring and routing that is performed on the enabled applications using the authoring SDK. This may allow the user 138 to hear the process live and during the post-production without needing to playback the audio through an enabled application. Accordingly, the user 138 may be able to use their studio in tandem with the control software 114 and plugins to mix for the target enabled application When the user 138 finalizes the mixing, the export file 118 may be transmitted through a communication channel 130, or (equivalently) recorded on a storage medium (for example, a physical server, a cloud-based server, a flash memory, a solid state hard drive, a CD, DVD or "Blu-ray" disk). It should be understood that for purposes of this disclosure, recording may be considered a special case of transmission. It should also be understood that the data may be further encoded in various layers for transmission or recording, for example by addition of cyclic redundancy checks (CRC) or other error correction, by addition of further formatting and synchronization information, physical channel encoding, etc. These conventional aspects of transmission do not interfere with the operation of the invention.

In an embodiment, the authoring SDK 120 may receive a conventional surround sound mix 144 directly and may perform the routing and authoring as described above. The surround sound mix 144 may be, for example, quad (4.0) surround, 5.1 surround, and/or 7.1 surround. Using the authoring and routing techniques described above on the separate surround sound channels, the authoring SDK 120 may use the orientation and position data 132 to sum the surround sound mix 144 as the biphonic audio 134. In other words, the authoring SDK 120 and enabled applications 120 may turn any surround sound mix 144 into the biphonic audio 134, thereby allowing the user 138 to experience the surround mix 144 as spatial audio without needing a surround sound system. Instead, the user 138 may hear the surround sound mix 144 summed properly to two channels of audio (e.g., the left channel **136*a* and the right channel 136*b*) that are adjusted based on the orientation and position data 132. In an embodiment, this may be applied to surround mixed music and film content by using the authoring SDK 120** to compile a standalone player.

Figure 7:
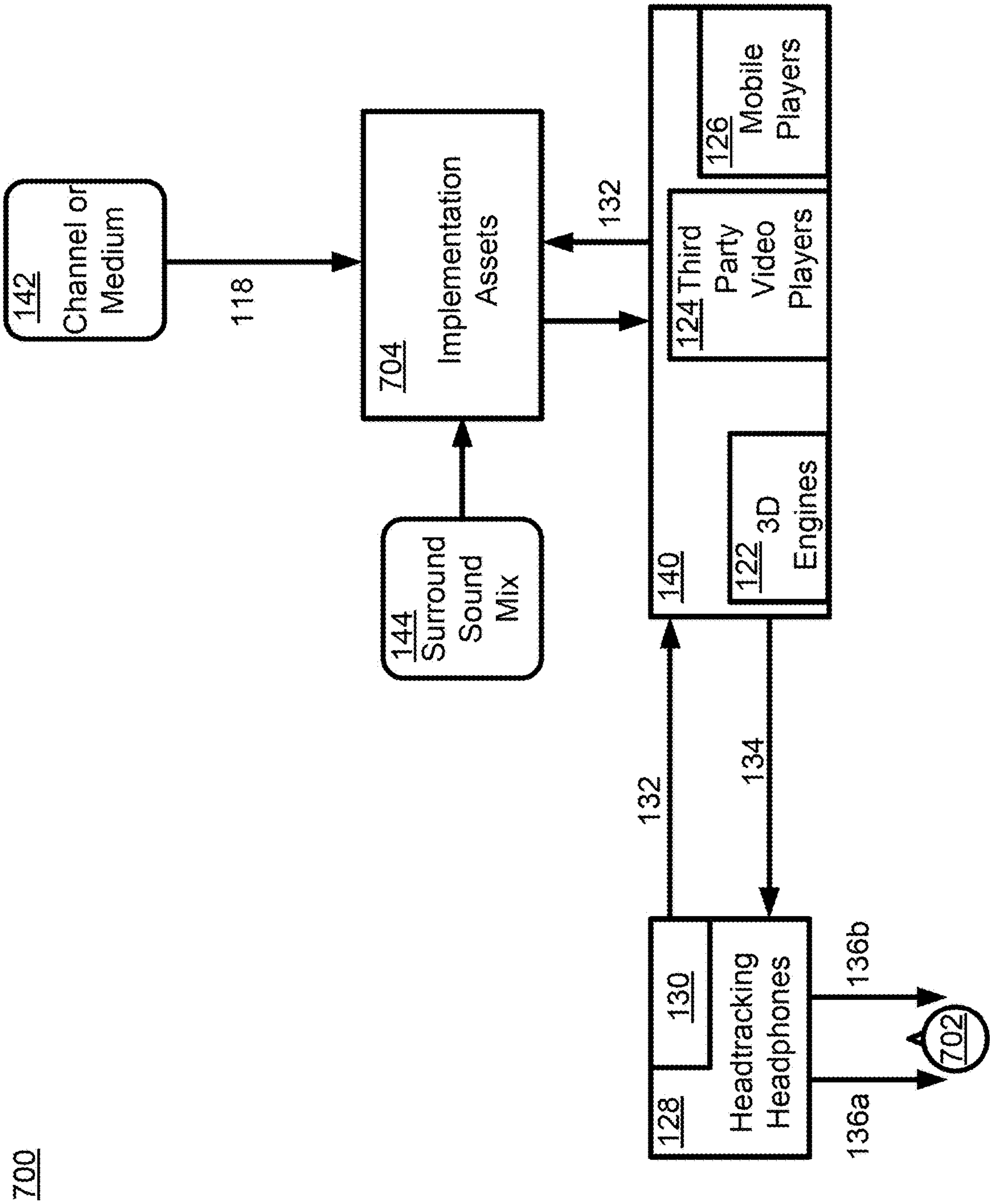
FIG. 7 is a system-level overview of a user system for reproducing biphonic spatial audio.

Referring now to FIG. 7, a system-level overview of a user-end system 700 for reproducing biphonic spatial audio in accordance with one or more embodiments is shown. The system 700 may simulate 3D environments and user interactivity within to provide high quality multichannel biphonic audio without any additional processing or filtering.

In an embodiment, the mixed export file 118 may be accessed from the communication channel 130 by implementation assets 704. The implementation assets 704 may be similar to the authoring SDK 120 and control software 114 described above. The implementation assets 704 may be located in a target device, such as, for example, a computing device, a virtual reality device, a video game console, a mobile device, or an audio player. In an embodiment, the implementation assets 704 may be adapted to act as actors and/or objects in 3D video engines 122. The implementation assets 704 may decode the export file 118 and may route the multiple audio tracks that are layered within export file 118 into the enabled applications 140 for playback. Examples of enabled applications 140 may include 3D video engines 122, third party video players 124, and mobile players 126.

The enabled applications 140 may be coupled to the headtracking headphones 128. The headtracking headphones 128 may include a pair of high fidelity headphones packaged with the inertial measurement unit (IMU) 130. In an embodiment, the headtracking headphones 128 may also include one or more of the following in any combination: an ultrasound/high frequency emitter, a microphone for each ear, hypercardoid microphones for active noise cancellation, an eight channel signal carrying cable, and one or more audio drivers per ear. The ultrasound/high frequency emitter may play a fast attack signal sound that is cycled multiple times per second. This fast attack signal sound may be picked up by microphones for impulse analysis. The impulse analysis may allow for a consistent updating of convolution reverb, which may be used to digitally simulate the reverberation of the user's physical or virtual space. The impulse analysis may be done using cycled ultrasonic signals, such as sweeps and pings, to capture the impulse of the user's 702 current space per a determined cycle. The ultrasonic signals may allow for the space to be mapped without sonically interfering with the human audible range. In an embodiment, the headtracking headphones 128 may also include a microphone per each ear. The hypercarclioid or binaural microphones may actively capture environmental sounds and may play a delayed phase inverted signal to cancel ambient sound around a listener. The microphones may be able play a mix of ambient controlled sounds (running through peak detection processing) and control the noise floor of the user's current space. This may allow for the proper mixing of the content created sound for augmented reality (AR) simultaneously through digital audio (DA) hardware from the connected device.

The IMU 130 may include a microcontroller operatively coupled to a rechargeable power source and motion sensors that track a user's head movements in real-time. In an embodiment, the motion sensors may include an accelerometer, a magnetometer, and a gyroscope. The IMU 130 may be able to track any movement of the user's head, such as the pitch, yaw, roll angles, acceleration, elevation, etc.

The IMU 130 may be contained within the pair of high fidelity headphones or may be self-contained in an attachable enclosure that may be affixed to conventional over-the-ear headphones. The microcontroller of the IMU 130 may be operatively coupled to a transceiver that allows the IMU 130 to connect and send the headtracking measurements gathered by the motion sensors as orientation and position data 132. The measurements may be transmitted by, for example, a wireless connection using an IEEE 802.11 protocol, a Bluetooth® connection, or a USB serial connection.

The orientation and position data 132 may be transmitted to the enabled applications 140. The enabled applications 140 may use the orientation and position data 132 in combination with routing schemes contained within the authoring SDK 120 to decode user orientation and create high quality interactive multichannel biphonic audio 134 to the high fidelity headphones without any additional processing or filtering.

Using routing algorithms included in the implementation assets 704, the user can input any number of audio channels from the export file 118 into all software which will properly route and decode an interactive multichannel biphonic audio mix to the headphones. The authoring allows any customizable amount of channels that route audio based on orientation and positioning while maintaining the same consistency without destruction of mixed audio input.

The implantation assets 704 may use one or more algorithms, as described above with reference to FIGS. 1-6B, to author and decode an n-channel input, such as the export file 118, as an interactive multichannel biphonic stereo mix for headphones based on user's orientation and positioning. The orientation and position data 132 may be used to "place" a user as a MI emitter within the modeling areas created by the M1 panning plugin 204, and the optimum audio mix for that location may be routed by the implementation assets 704.

In an embodiment, the enabled applications 140 may be coupled to a head-mounted display (HMD). The enabled applications 140 and the authoring SDK 130 may use orientation data from the HMD as orientation and position data 132 for use in the authoring and routing as described above.

The enabled applications 140 may then transmit a biphonic audio mix 134 to the headtracking headphones 128 using any conventional medium, such as, for example a 3.5 mm audio jack, a lightning connector, a wireless IEEE 802.11 protocol, a Bluetooth® connection, or a USB serial connection. The biphonic audio mix 134 may be received by the headtracking headphones 128 and converted into physical sound using two or more electro-dynamic drivers (e.g., miniature speakers). In an embodiment, the headtracking headphones 128 may deliver sound to a left ear of a user 702 through a left channel 136*a* and to a right ear of the user 702 through a right channel 136*b*.

Unlike conventional binaural methods, which process a single audio mix on the fly and send the processed sound to each ear, the biphonic audio mix 134 may be established in a production studio. The audio channels may be duplicated for each ear on separate stereo channels 136*a* and 136*b* to ensure the stereo field is preserved. This arrangement may be more ideal for audio engineers, which may retain more control over the final sound, and may reduce or eliminate latency issues.

In an embodiment, the implementation assets 704 may receive the conventional surround sound mix 144 directly and may perform the routing and authoring as described above. The surround sound mix 144 may be, for example, quad (4.0) surround, 5.1 surround, and/or 7.1 surround. Using the authoring and routing techniques described above on the separate surround sound channels, the implementation assets 704 may use the orientation and position data 132 to sum the surround sound mix 144 as the biphonic audio 134. In other words, the implementation assets 704 and enabled applications 120 may turn any surround sound mix 144 into the biphonic audio 134, thereby allowing the listener 702 to experience the surround mix 144 as spatial audio without needing a surround sound system. Instead, the listener 702 may hear the surround sound mix 144 summed properly to two channels of audio (e.g., the left channel 136*a* and the right channel 136*b*) that are adjusted based on the orientation and position data 132.

In an embodiment, the headtracking headphones 128 and the IMU 130 may be coupled with one or microphones. The use of microphones in conjunction with multichannel biphonic authoring & routing may be used to create and interact with applications to be used with Augmented Reality (AR). In AR applications the use of multisampling microphone inputs may be used to dynamically change the multichannel biphonic audio mix gain based on the average (e.g., by root mean square) of ambient noise to the user over predetermined sample times.

More specifically, the microphones may perform the following functions. The sum of their recorded stereo audio may be directly mixed into the routing of the multichannel biphonic mix. In addition, the microphones may take multi-sample measurements per second of ambient acoustic noise levels. The headtracking headphones 128 may use this data to create a root mean square (RMS) average of the ambient acoustic levels to track dynamic changes in gain. The dynamic gain changes may also be replicated on the multi-channel biphonic mix through the implementation assets 704 and the enabled applications 140 to keep the user's audio consistent in regards to the complete sum. The gain changes detected from the ambient acoustic measurements may affect the max shared gain of all the multichannels in the authoring implementation assets 704 and the enabled applications 140. When incorporated with active/passive speaker playback via the headtracking headphones 128, the user may be immersed with dynamic AR audio.

Figure 8:
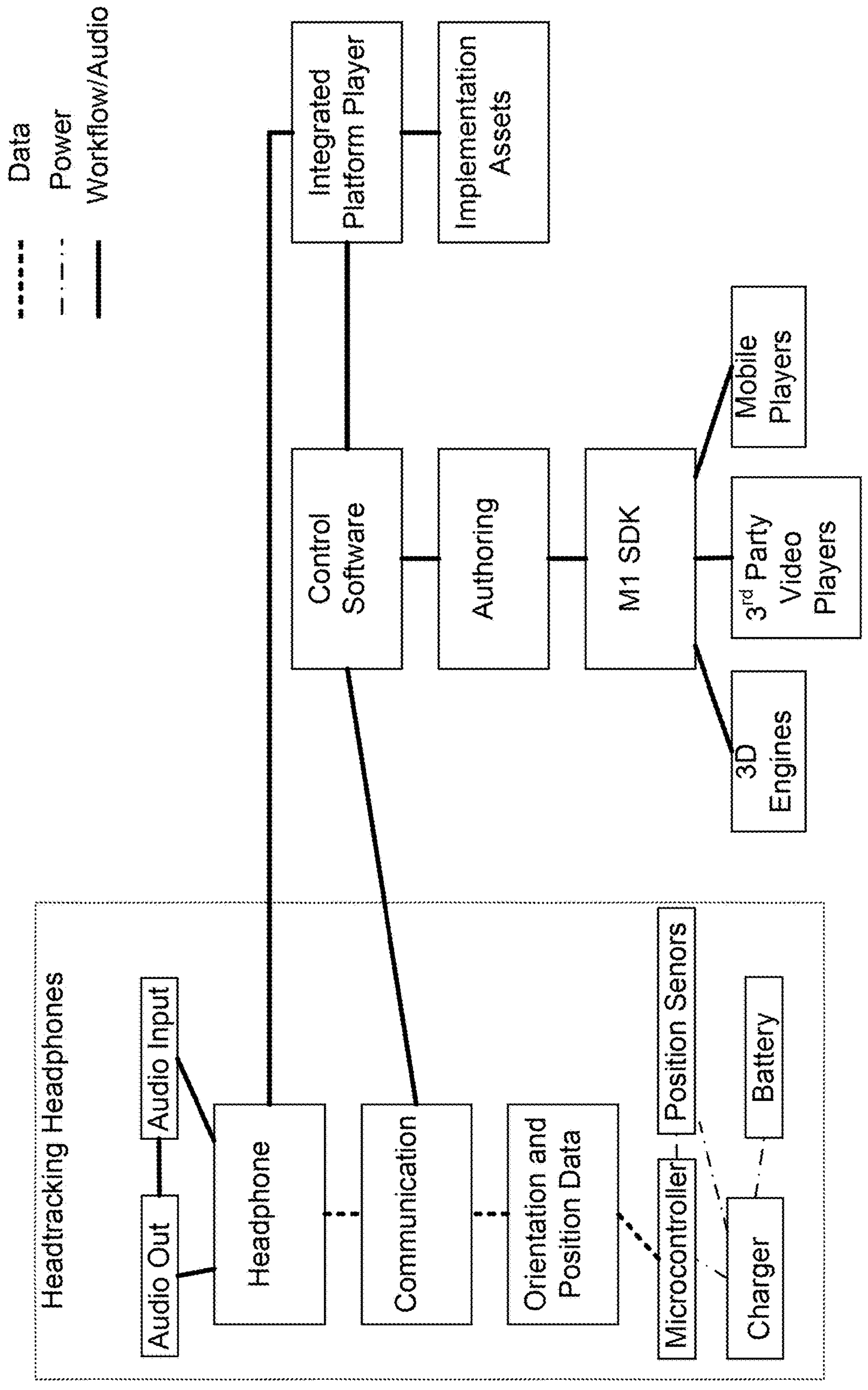
FIG. 8 is a diagram illustrating the functional relationship between components of the headtracking headphones, authoring, and playback/integration.

Referring now to FIG. 8, a diagram illustrating the functional relationship between components of the head-tracking headphones 128, the authoring, and playback/integration is shown. The Mach1 VII Tools may correspond to the control software 114 and the plugins as described above with reference to FIG. 1. The Integrated Platform Player may correspond to the enabled applications 140 as described above with reference to FIGS. 1-2. The orientation and position data 132 recorded by the IMU 130, or by a HMD unit, may be transmitted to the Mach1 VR Tools and the Integrated Platform Player. As described above, the orientation and positon data may be used to "place" a user within a modeling space, and route audio optimally mixed for that location to the user.

Figure 9A:
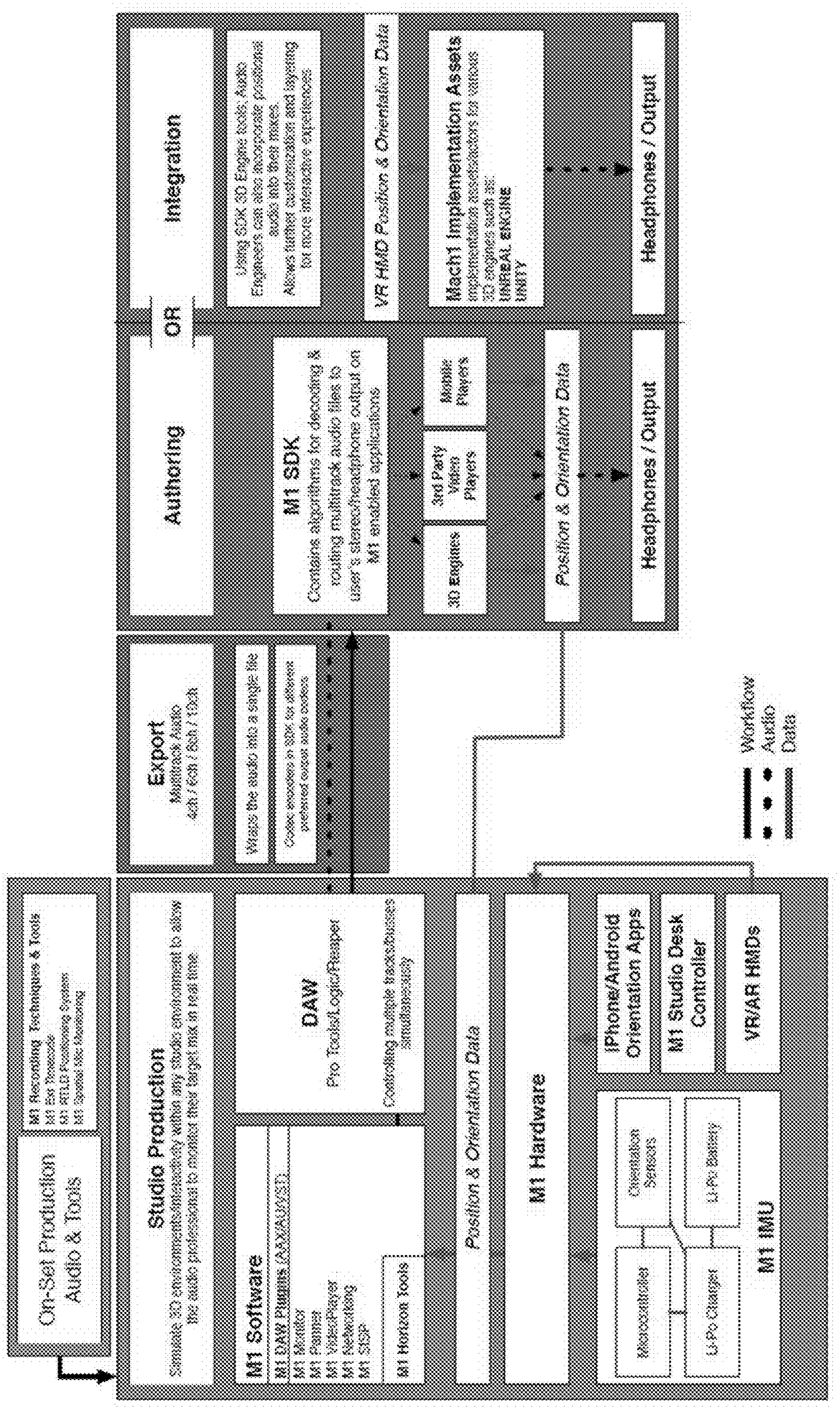
FIGS. 9A-9B are workflow diagrams illustrating the general stages for encoding, transmitting, and reproducing spatial audio.
Figure 9B:
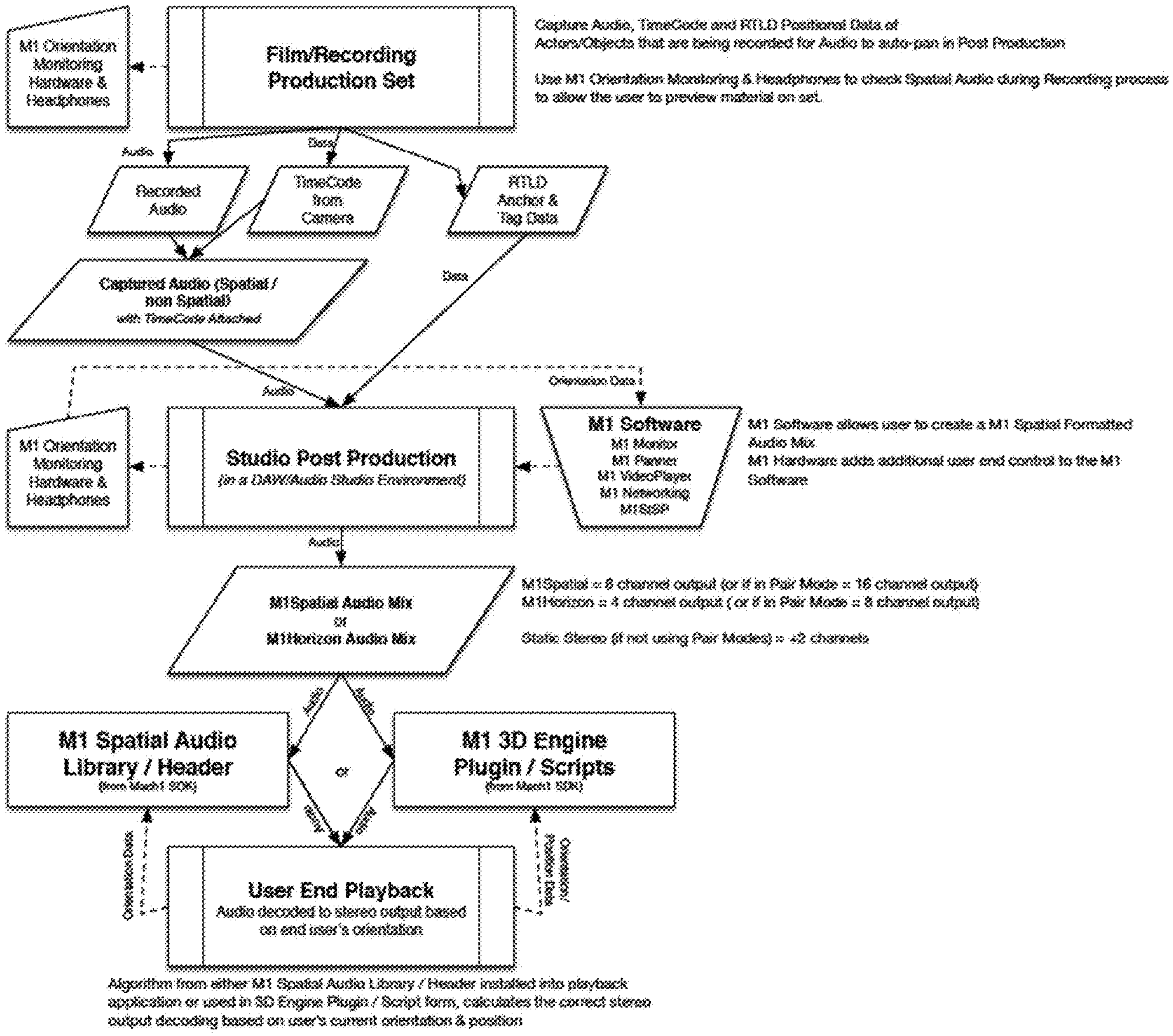

Referring now to FIGS. 9A-B, workflow diagrams illustrating an overview of the general stages, as described above, for encoding, transmitting, and reproducing biphonic spatial audio is shown. As described above, the stages may include: production, exporting, authoring, and integration. As shown in FIG. 9A, the user 138 may utilize the control software 114 and hardware to encode a single mix from their DAW which may then be exported as a single multichannel audio output. The output may be played back with the decoding algorithm from the M1 SDK to decode to the stereo output based on user 702 orientation. Alternatively, the output may be integrated into a 3D engine as a layer of spatial sound in an interactive project.

As shown in FIG. 9B, during recording/production, the hardware and software may enable a user 138 to capture audio, a time code, and RTLD positional data of actors/objects that are being recorded to be auto-panned in post-production. The control software 114 and headphones (e.g., headtracking headphones 128) may be used to check the spatial audio during recording process to allow the user 138 to preview material on set. The control software 114 may allow the user 138 to create an encoded M1 spatial formatted audio mix. The M1 hardware may add additional user end control to the control software 114. The audio output may be M1 Spatial, which may be an 8 channel output, or a 16 channel output if in pair mode. The audio output may be M1 Horizon format, which may be a 4 channel output, or an 8 channel output if in pair mode. The audio output may be static stereo, which may be 2 channels if not using pair mode. During playback, the processes described above (e.g., from either a M1 spatial audio library, a header installed into the playback application, or 3D engine plugin or script) may be used to calculate the correct stereo output decoding based on user's current orientation & position.

Figure 10:
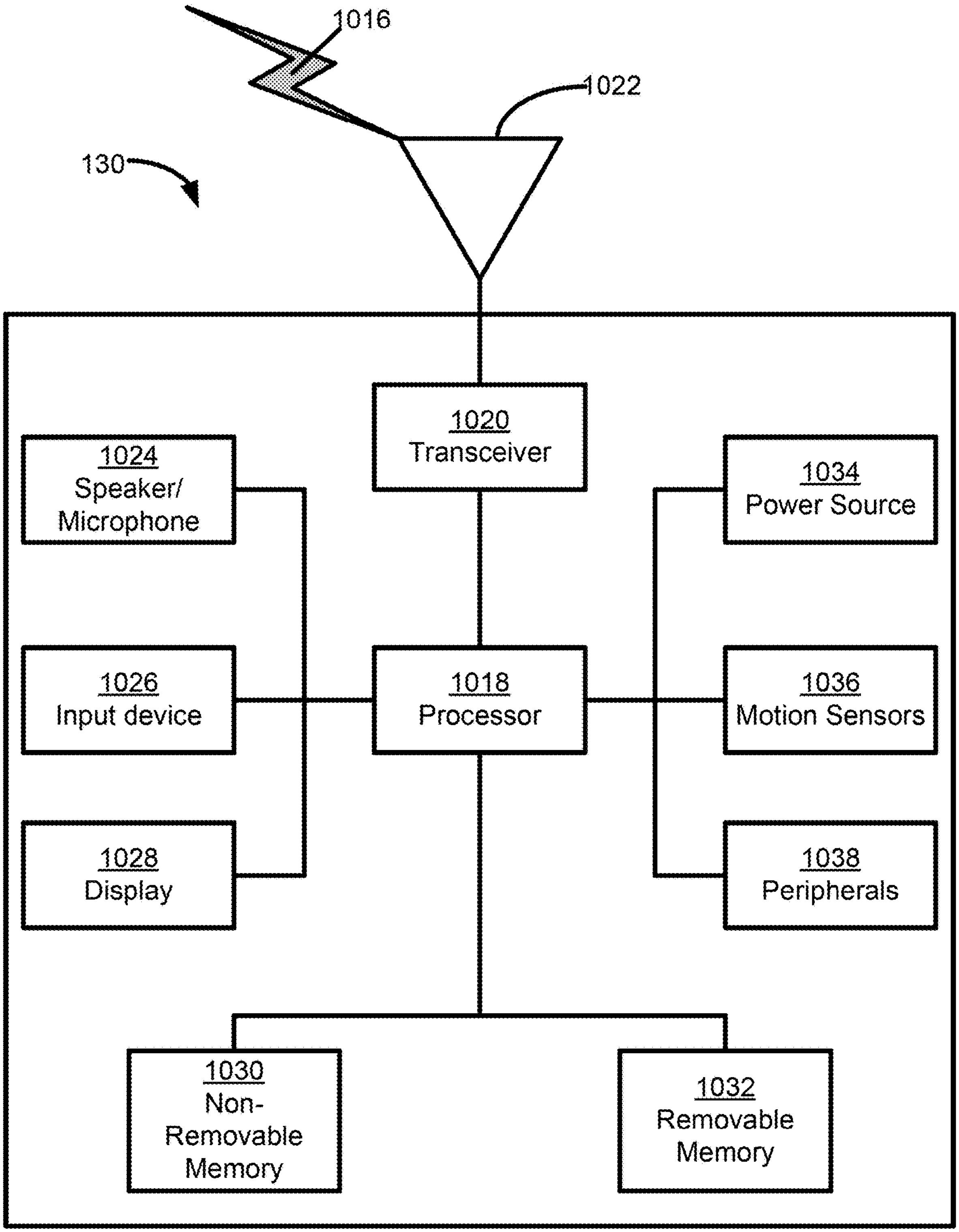
FIG. 10 is a component diagram of an inertial measurement unit (IMU) used in the headtracking headphones.

Referring now to FIG. 10, a component diagram of the IMU 130 is shown. As described above, the IMU 130 may be part of an attachable enclosure that may be affixed to a pair of over-the-ear headphones, or it may be integrated directly into the headphones themselves.

The IMU 130 may include a microcontroller 1018, a transceiver 1020, a transmit/receive element 1022, a speaker/microphone 1024, an input device 1026, a display 1028, a non-removable memory 1030, removable memory 1032, a power source 1034, motion sensors 1036, and other peripherals 1038. It will be appreciated that the IMU 130 may include any sub-combination of the foregoing elements while remaining consistent with an embodiment.

The microcontroller 1018 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The microcontroller 1018 may perform signal coding, data processing, power control, input/output processing, and/or any other functionality that enables the IMU 130 to operate in a wireless environment. The microcontroller 1018 may be coupled to the transceiver 1020, which may be coupled to the transmit/receive element 1022. While FIG. 10 depicts the microcontroller 1018 and the transceiver 1020 as separate components, it will be appreciated that the microcontroller 1018 and the transceiver 1020 may be integrated together in an electronic package or chip.

The transmit/receive element 1022 may be configured to transmit signals to, or receive signals from, the enabled applications 140 over an air interface 916 as described above. For example, in one embodiment, the transmit/receive element 1022 may be an antenna configured to transmit and/or receive radio frequency (RF) signals. In another embodiment, the transmit/receive element 1022 may be an emitter/detector configured to transmit and/or receive infrared (IR), ultraviolet (UV), or visible light signals, for example. In yet another embodiment, the transmit/receive element 1022 may be configured to transmit and receive both RF and light signals. It will be appreciated that the transmit/receive element 1022 may be configured to transmit and/or receive any combination of wireless signals.

In addition, although the transmit/receive element 1022 is depicted as a single element, the IMU 130 may include any number of transmit/receive elements 1022. More specifically, the IMU 130 may employ MIMO technology. Thus, in one embodiment, the IMU 130 may include two or more transmit/receive elements 1022 (e.g., multiple antennas) for transmitting and receiving wireless signals over the air interface 916.

The transceiver 1020 may be configured to modulate the signals that are to be transmitted by the transmit/receive element 1022 and to demodulate the signals that are received by the transmit/receive element 1022. As noted above, the IMU 130 may have multi-mode capabilities.

The microcontroller 1018 may be coupled to, and may receive user input data from, the speaker/microphone 1024, the input 1026, and/or the display 1028 (e.g., a liquid crystal display (LCD) display unit or organic light-emitting diode (OLED) display unit). The microcontroller 1018 may also output user data to the speaker/microphone 1024, the input 1026, and/or the display 1028. In addition, the microcontroller 1018 may access information from, and store data in, any type of suitable memory, such as the non-removable memory 1030 and/or the removable memory 1032. The non-removable memory 1030 may include random-access memory (RAM), read-only memory (ROM), a hard disk, or any other type of memory storage device. The removable memory 1032 may include a subscriber identity module (SIM) card, a memory stick, a secure digital (SD) memory card, and the like. In other embodiments, the microcontroller 1018 may access information from, and store data in, memory that is not physically located on the IMU 130, such as on a server or a home computer (not shown).

The microcontroller 1018 may receive power from the power source 1034, and may be configured to distribute and/or control the power to the other components in the IMU 130, such as the motion sensors 1036. The power source 1034 may be any suitable device for powering the IMU 130. For example, the power source 1034 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The microcontroller 1018 may also be coupled to the motion sensors 1036. As described above, the motion sensors 1036 may include physical and/or electrical devices that can measure the acceleration, velocity, pitch, yaw, roll, height, and/or rotation of a user's head. Examples of motion sensors 1036 may include an accelerometer, a magnetometer, and gyroscope which may be used in any combination or subset.

The microcontroller 1018 may further be coupled to other peripherals 1038, which may include one or more software and/or hardware modules that provide additional features, functionality and/or wired or wireless connectivity. For example, the peripherals 1038 may include an e-compass, a satellite transceiver, a digital camera (for photographs or video), a universal serial bus (USB) port, a vibration device, a television transceiver, a remote, a Bluetooth® module, a frequency modulated (FM) radio unit, a digital music player, a media player, a video game player module, an Internet browser, and the like.

Figure 11:
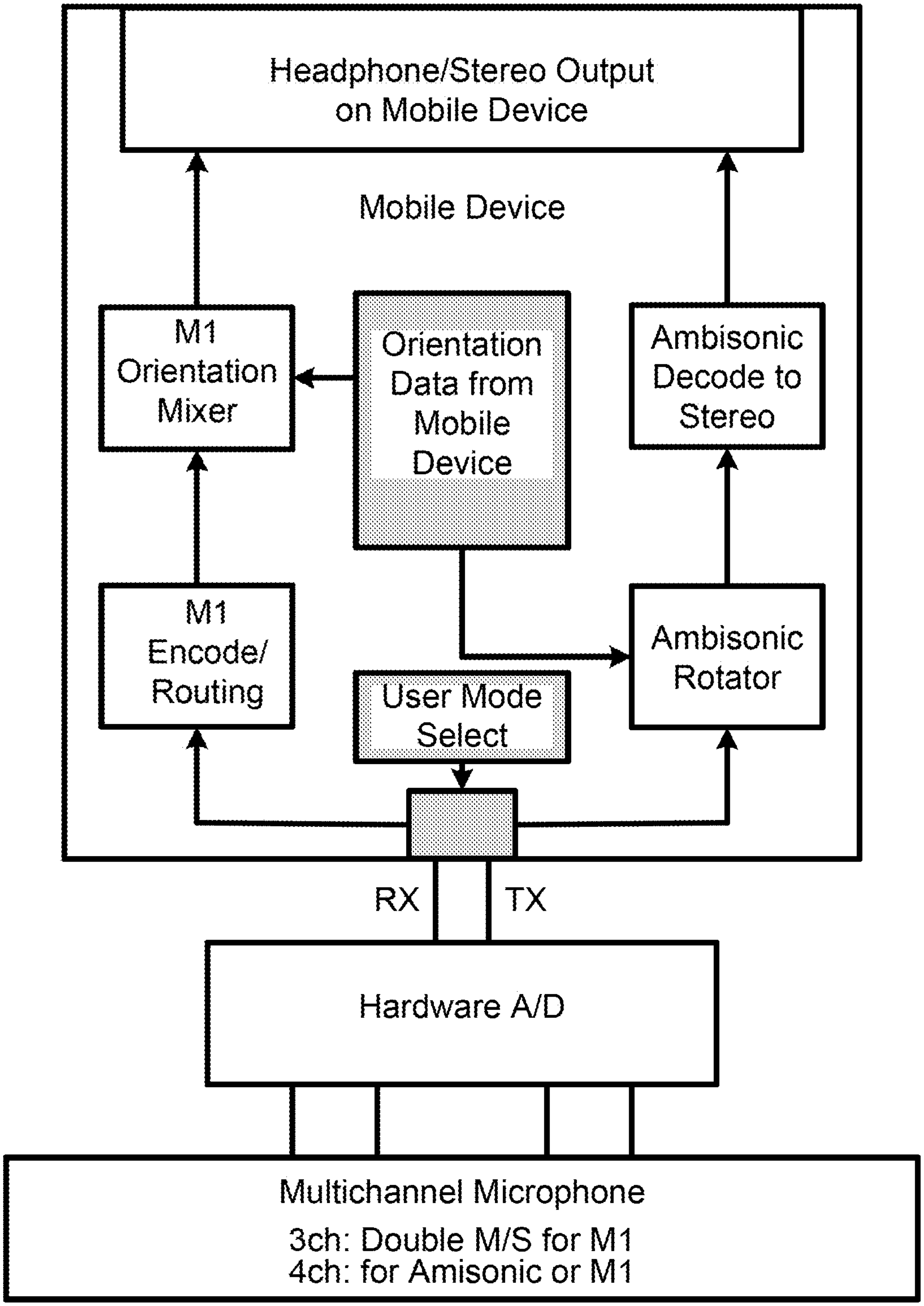
FIG. 11 is a diagram of devices for mobile orientation monitoring.

Referring now to FIG. 11, a diagram of devices for mobile orientation monitoring is shown. The devices shown in FIG. 11 may allow for the mobile monitoring of multichannel spatial audio recording microphone configuration with use of a mobile electronic device, such as a smartphone, tablet, or wearable device. Embodiments may allow users to properly listen and monitor recordings as they take place for spatial and directional audio. This may be especially useful during field recordings and may allow users to pre-monitor and properly set up and adjust microphones during productions.

In an embodiment, a multichannel microphone may be used to record ambient audio. The multichannel microphone may be a conventional recording device that can capture audio and convert it into three or more channels.

The multichannel microphone may send the three or more channels of audio to a conventional analog to digital (A/D) conversion device. The A/D conversion device may be connected to the mobile electronic device by a conventional wired connection supporting at least three input channels (e.g., Lightning™ connector, Universal Serial Bus (USB) connector, mini-USB connector, or micro-USB connector) or by a wireless communication interface (e.g., WiFi or Bluetooth™. The A/D conversion device may allow for the three or more channels of audio to be converted from an analog input to digital audio for further processing. After conversion to digital audio, the three or more channels may be passed to audio buffers within the mobile electronic device, which may then apply appropriate channel designation to convert the audio into different formats. The audio buffers may then perform the authoring, routing, and mixing as described above with reference to any one of the embodiments.

Through a user mode select switch, which may be hardware or software, a user may select between different types of formats based on the three or more channels. If three channels are input into the A/D stage, the three channels may be used for a double mid/side (M/S) technique, which may be described in more detail below. If four channels are input into the A/D stage, the four channels may be converted into 4 channel Office de Radiodiffusion Television Francaise (ORTF) or quad format, 4 channel A-Format ambisonic, or 4 channel B-Format ambisonic.

The ambisonic formatted audio may be sent to an ambisonic rotator. The ambisonic rotator may receive yaw input from the IMU 130 of the connected headtracking enabled device or the mobile electronic device's orientation sensors. Using the yaw input, the ambisonic rotator may rotate the ambisonic formatted audio around a spherical coordinate system using conventional ambisonic processing techniques. In an embodiment, the following algorithm may be used:

$$R(\phi,\theta,\psi)=\underbrace{\begin{pmatrix}1&0&0\\0&\cos\phi&-\sin\phi\\0&\sin\phi&\cos\phi\end{pmatrix}}_{x\text{-axis-rotation (roll)}}\cdot\underbrace{\begin{pmatrix}\cos\theta&0&\sin\theta\\0&1&0\\-\sin\theta&0&\cos\theta\end{pmatrix}}_{y\text{-axis-rotation (pitch)}}\cdot\underbrace{\begin{pmatrix}\cos\psi&-\sin\psi&0\\\sin\psi&\cos\psi&0\\0&0&1\end{pmatrix}}_{z\text{-axis-rotation (yaw)}}. \quad \text{Equation (5)}$$

After the ambisonic rotator, the ambisonic formatted audio may be sent to an ambisonic stereo decoder to be decoded, downmixed, and summed as a 2 channel output. Finally, the audio may be sent to a headphone/stereo output of the mobile electronic device.

The 4 channel ORTF or quad based configuration and the 3 channel double M/S configuration may be sent to the M1 Encode/Routing function, which may perform the authoring, routing, and mixing described above. Next, the audio may be sent to the M1 orientation mixer, which may apply the user's yaw input as described above from either the IMU 130 of the connected headtracking enabled device or the mobile electronic device's orientation sensors.

Figure 12:
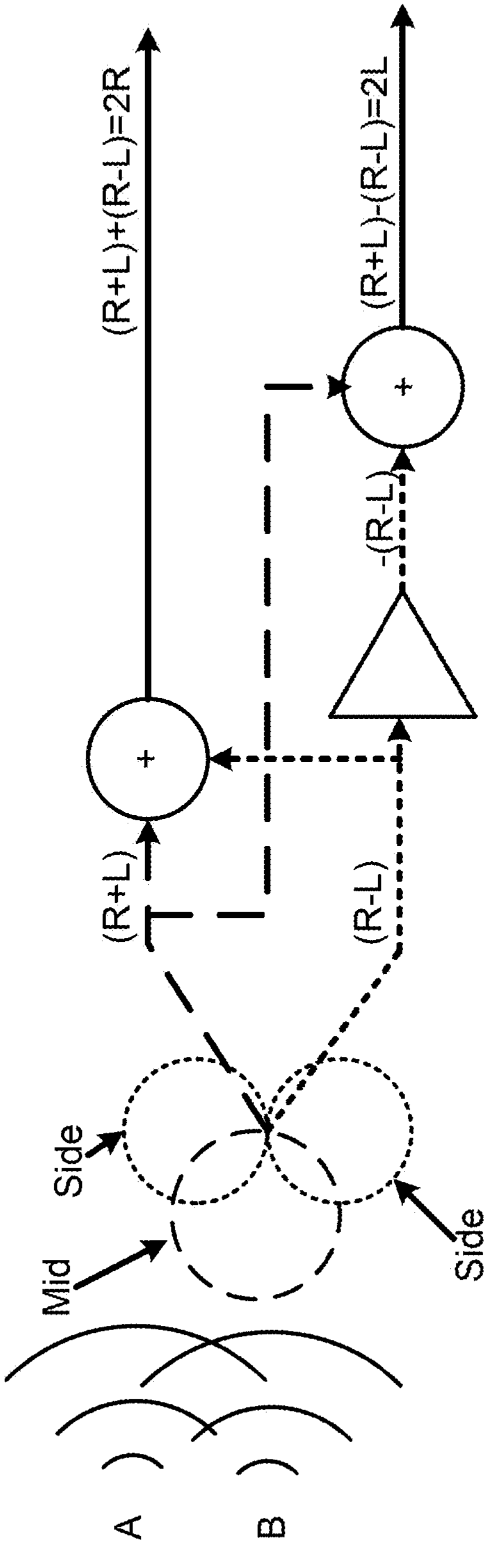
FIG. 12 is a diagram illustrating Mid/Side decoding.

Referring now to FIG. 12, when using the 3 channel input method, the 'M' (mid) channel and a first 'S' (side) channel may be run through a conventional M/S decoding process to produce the first two channels of 'quad.' The 'M' (mid) channel and a second 'S' (side) channel may be run through M/S decoding to produce the second two channels of 'quad' after channel order for those two channels are flipped. In an embodiment, the decoding may be represented by the following equations:

$$\text{LEFT}=M+S=(L+R)+(L-R)=2L \quad \text{Equation (6)}$$

$$\text{RIGHT}=M-S=(L+R)-(L+R)=2R \quad \text{Equation (7)}$$

In this manner, 4 channels of audio may be input to the M1 orientation mixer, which may then apply the orientation and position data 132 to the horizontal audio as described above. Finally, the audio may be sent to a headphone/stereo output of the mobile electronic device.

Figure 13:
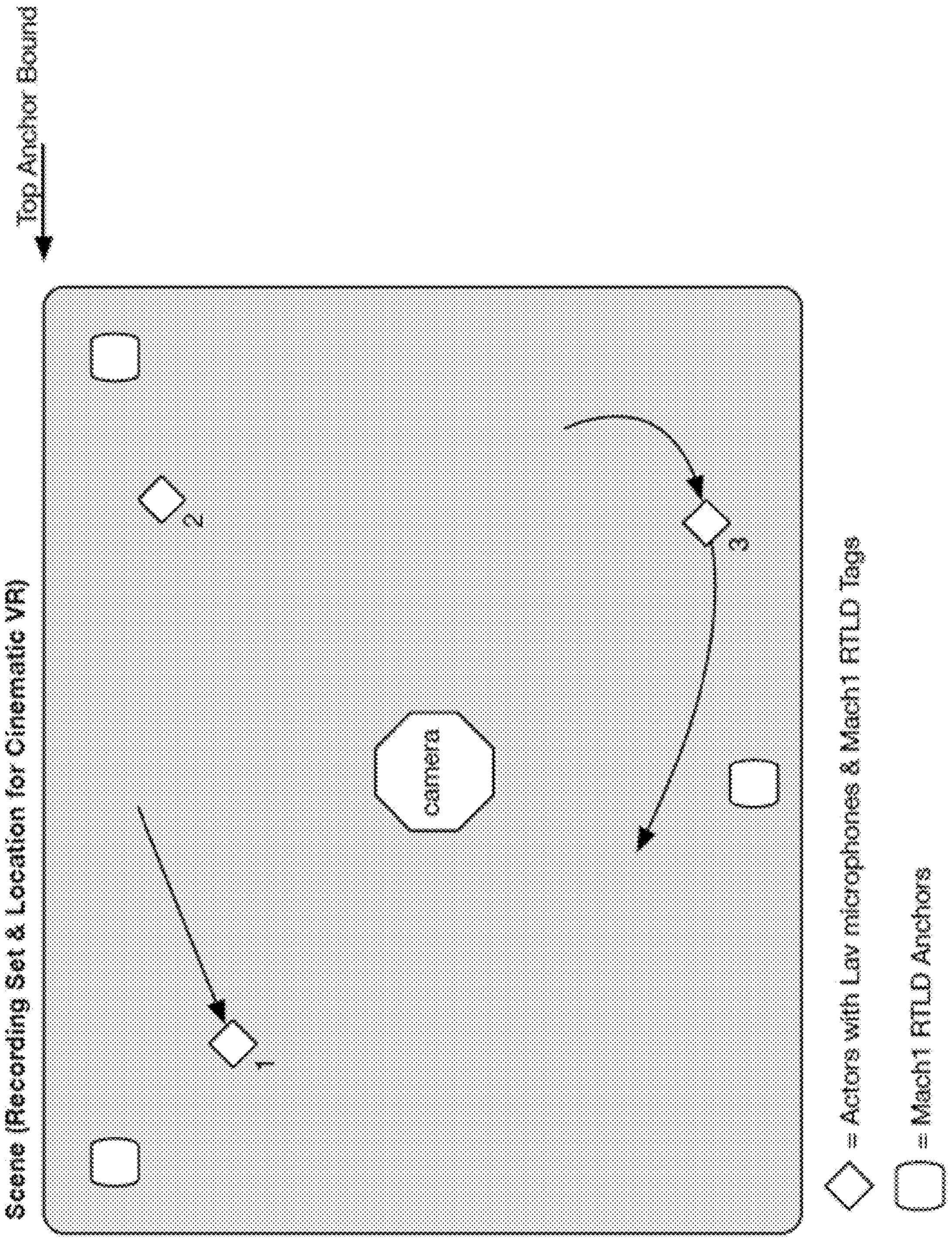
FIG. 13 is diagram illustrating the capture of the orientation and position data during recording.

Referring now to FIG. 13, a diagram illustrating the capture of the orientation and position data during recording is shown. The positional data of actors may be captured with the use of ultra-wideband (UWB) transceivers placed on the actors. The actors may also have lavalier microphones and Real Time Location Data (RTLD) tags. The tags may track the positional data in relation to the anchors. The positional data may be stored as a log for input to the control software 114. The positional data may be converted from top-down Cartesian coordinates to rotational angles using the comparative location of the actors to one or more RTLD anchors. The camera may remain stationary. The RTLD may also be stationary and may need to be moved if the camera moves. The output of the calculation may be passed to the Azimuth input of the M1 panning plugin 204 in the control software 114 as the orientation and position data 132 described above. This may enable automatic panning for projects that have live-captured moving audio sources in a scene.

Figure 14:
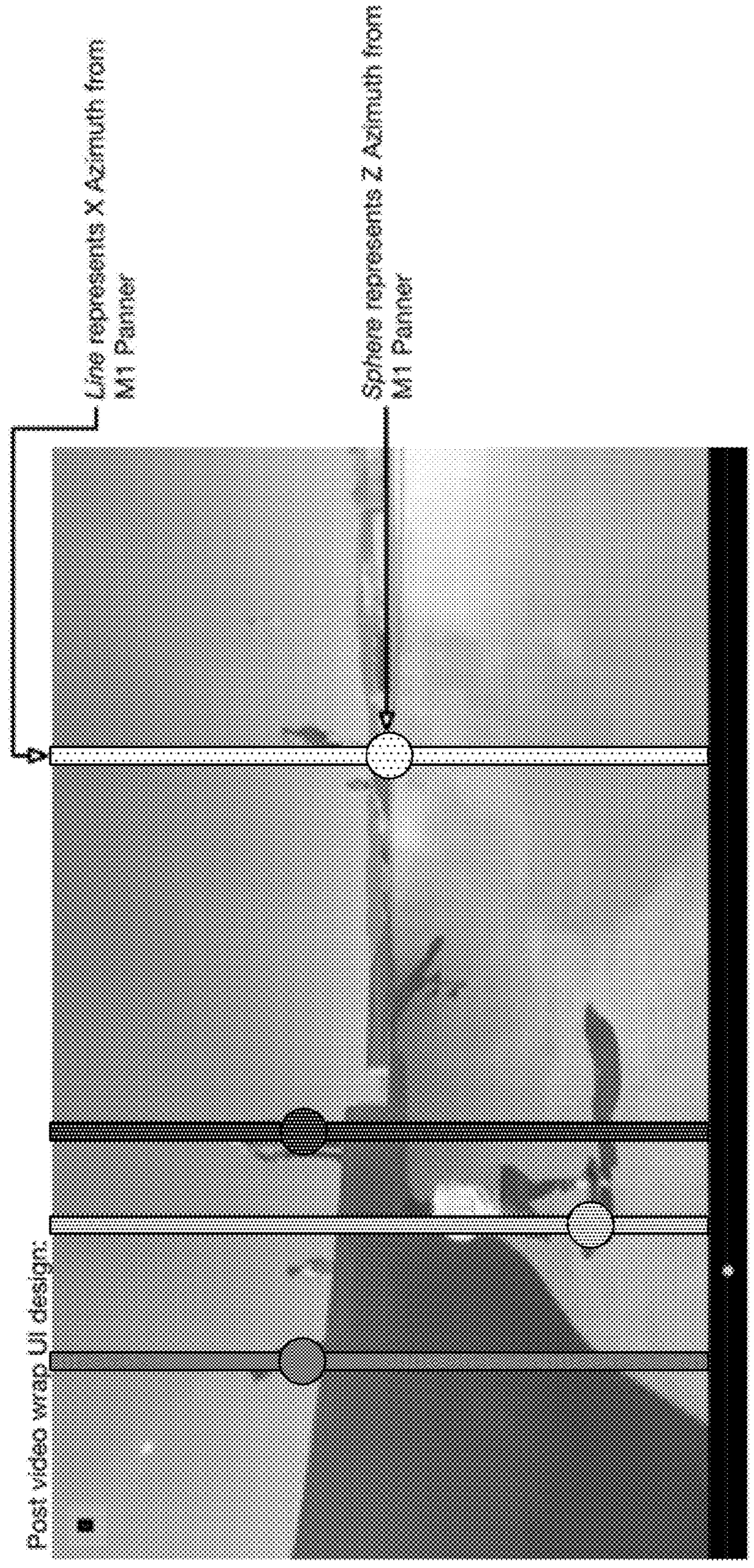
FIG. 14 is an illustration of an interactive user interface (UI) design for the M1 panning plugin.

Referring now to FIG. 14, an illustration of an interactive user interface (UI) design for the M1 panning plugin 204 that may be used with two-dimensional video, VR, and AR applications. The embodiments described herein may allow a user to orientate an audio track spatially around a user directly from a video or VR/AR platform.

Using User Datagram Protocol (UDP) communication between the M1 panning plugin 204 and a video player or VR/AR application, the location of spatially panned audio may be shared. This may allow users to more easily and directly orientate sounds spatially against rendered 360 spherical video. In an embodiment, the spatial coordinates of an object emitting a sound may be converted to radians and may be casted onto the video. This may allow for a video to be played in a HMD while using timed gaze to move panning within the VR/AR environment.

In an embodiment, one or more instances of the M1 panning plugin 204 may be run in order to case a colored interactive overlay onto a video. The M1 panning plugin 204 may have a color selection dropdown menu for changing the coloring of the UI overlay. The UI overlay may have a line element, which may represent the X azimuth (left/right), and a sphere element, which may represent the Z azimuth (up/down). Both the line element and the sphere element may be moveable. The sphere element may always be within a line element and may always move with it. A user may be able to automate and pan/control directional sounds from the M1 panning plugin 204 within the video player or VR/AR application during video playback. In an embodiment, only an active M1 panning plugin 204 may be displayed as a UI overlay.

The user may be able to control the UI overlay using or more inputs. For example, a hotkey on a HMD display may be used along with a user's center of gaze to select and control a line and/or sphere. While selected, the user may be able to drag and control the line and/or sphere by gaze (i.e., looking around the wrapped video environment of the VR/AR application). In another example, a user may be able to use a conventional keyboard and mouse/trackpad to select and control a line and/or sphere by clicking the mouse or pressing a key. While holding down the mouse button or key, the user may be able to drag and control the line and/or sphere. A user may move a single line/sphere or may move multiple line/spheres as a group. The user may be able to view all grouped overlays simultaneously. In an embodiment, a track selection UI may be used that allows a user to view, scroll, and select audio tracks. The user may be able to control the DAW or video by controls such as play, stop, fast forward, rewind, etc. The user may be able to spread the audio with a pulling maneuver. This may allow the user to spread two mono sources of audio in a stereo track by stretching out the side of the visual reticle.

Figure 15:
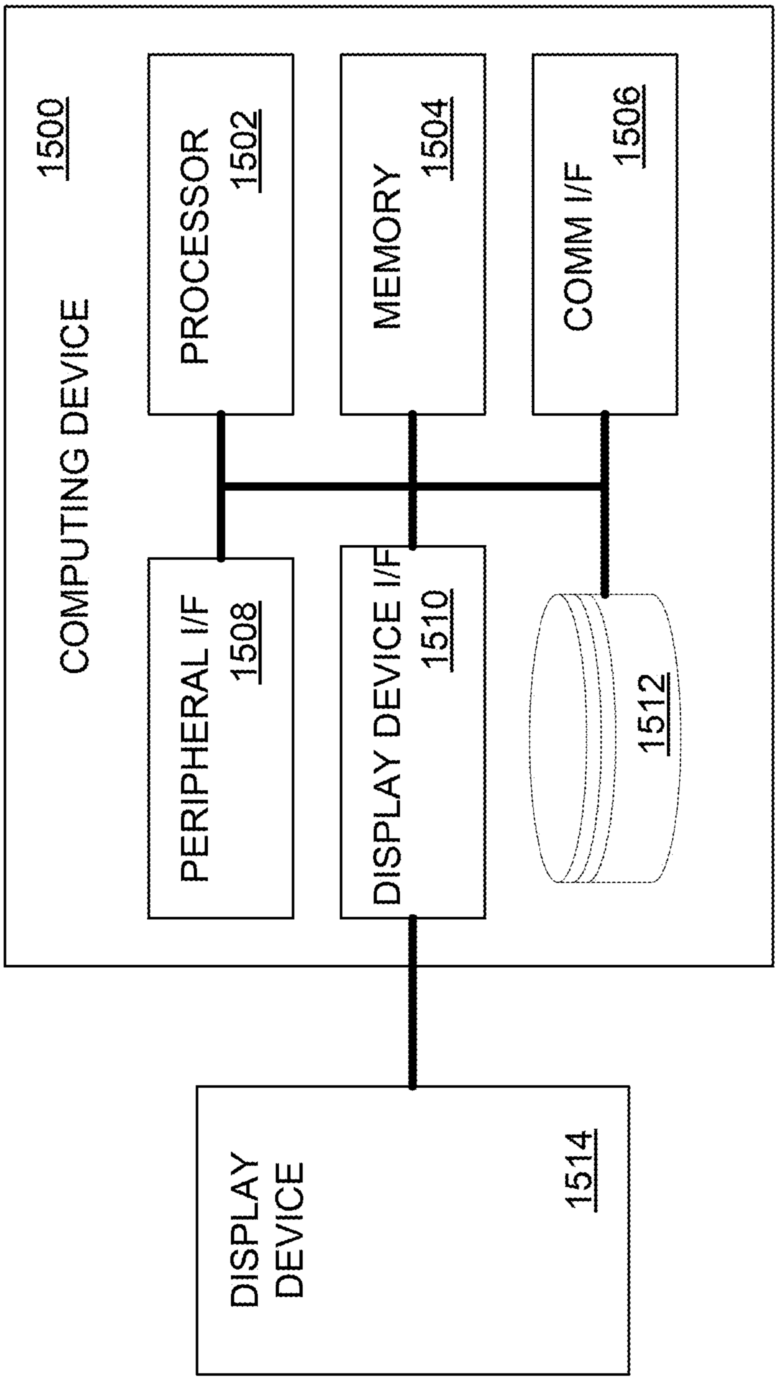
FIG. 15 is an example computing device that may be used in conjunction with the following embodiments.

Referring now to FIG. 15, an example computing device 1500 that may be used to implement features of the elements described above is shown. The computing device 1500 may include a processor 1502, a memory device 1504, a communication interface 1506, a peripheral device interface 1508, a display device interface 1510, and a storage device 1512. FIG. 15 also shows a display device 1514, which may be coupled to or included within the computing device 1500.

The memory device 1504 may be or include a device such as a Dynamic Random Access Memory (D-RAM), Static RAM (S-RAM), or other RAM or a flash memory. The storage device 1512 may be or include a hard disk, a magneto-optical medium, an optical medium such as a CD-ROM, a digital versatile disk (DVDs), or Blu-Ray disc (BD), or other type of device for electronic data storage.

The communication interface 1506 may be, for example, a communications port, a wired transceiver, a wireless transceiver, and/or a network card. The communication interface 1506 may be capable of communicating using technologies such as Ethernet, fiber optics, microwave, xDSL (Digital Subscriber Line), Wireless Local Area Network (WLAN) technology, wireless cellular technology, and/or any other appropriate technology.

The peripheral device interface 1508 may be an interface configured to communicate with one or more peripheral devices. The peripheral device interface 1508 may operate using a technology such as Universal Serial Bus (USB), PS/2, Bluetooth, infrared, serial port, parallel port, and/or other appropriate technology. The peripheral device interface 1508 may, for example, receive input data from an input device such as a keyboard, a mouse, a trackball, a touch screen, a touch pad, a stylus pad, and/or other device. Alternatively or additionally, the peripheral device interface 1508 may communicate output data to a printer that is attached to the computing device 1500 via the peripheral device interface 1508.

The display device interface 1510 may be an interface configured to communicate data to display device 1014. The display device 1014 may be, for example, a monitor or television display, a plasma display, a liquid crystal display (LCD), and/or a display based on a technology such as front or rear projection, light emitting diodes (LEDs), organic light-emitting diodes (OLEDs), or Digital Light Processing (DLP). The display device interface 1510 may operate using technology such as Video Graphics Array (VGA), Super VGA (S-VGA), Digital Visual Interface (DVI), High-Definition Multimedia Interface (HDMI), or other appropriate technology. The display device interface 1510 may communicate display data from the processor 1502 to the display device 1514 for display by the display device 1514. As shown in FIG. 15, the display device 1514 may be external to the computing device 1500, and coupled to the computing device 1500 via the display device interface 1510. Alternatively, the display device 1514 may be included in the computing device 1500.

An instance of the computing device 1500 of FIG. 15 may be configured to perform any feature or any combination of features described above. In such an instance, the memory device 1504 and/or the storage device 1512 may store instructions which, when executed by the processor 1502, cause the processor 1502 to perform any feature or any combination of features described above. Alternatively or additionally, in such an instance, each or any of the features described above may be performed by the processor 1502 in conjunction with the memory device 1504, communication interface 1506, peripheral device interface 1508, display device interface 1510, and/or storage device 1512.

Although FIG. 15 shows that the computing device 1500 includes a single processor 1502, single memory device 1504, single communication interface 1506, single peripheral device interface 1508, single display device interface 1510, and single storage device 1512, the computing device may include multiples of each or any combination of these components 1502, 1504, 1506, 1508, 1510, 1512, and may be configured to perform, mutatis mutandis, analogous functionality to that described above.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for providing a spatial audio signal representative of physical sound to a listener, the method comprising:

receiving position and orientation data of a head of the listener at an enabled application, wherein the enabled application is coupled to an authoring software development kit (SDK);

routing one or more streams of an audio track into one or more stereo pairs based on a routing track;

crossfading between the routed one or more stereo pairs based on the received position and orientation data, wherein the received position is modeled to a location of a mono input (MI) emitter in a modeling vector space that is encoded in the audio track; and generating one or more output channels.

2. The method of claim 1, wherein the position and orientation data is measured using an inertial measurement unit (IMU).

3. The method of claim 2, wherein the IMU comprises an accelerometer, a magnetometer, and a gyroscope.

4. The method of claim 2, wherein the IMU is affixed to a pair of headphones.

5. The method of claim 1, wherein the orientation and position data comprises pitch, yaw, roll angel, acceleration, and elevation of the listener's head.

6. The method of claim 1, wherein the modeling space comprises a plurality of emitters at various locations.

7. The method of claim 1, wherein the spatial audio signal can be broadcasted to any number of listeners, each receiving position and orientation data of the listener's head at an enabled application, wherein the enabled application is coupled to an authoring software development kit (SDK).

8. The method of claim 7, wherein the broadcast can be transmitted over LAN or WAN.

9. The method of claim 1, wherein the surround sound track is quad (4.0) surround comprising 4 channels of audio data.

10. The method of claim 1, wherein the surround sound track is 5.1 surround comprising 6 channels of audio data.

11. The method of claim 1, wherein the surround sound track is 7.1 surround comprising 8 channels of audio data.

12. The method of claim 1, wherein the orientation and position information of the head of the listener correlates to a location of the one or more MI emitters in the modeling space.

13. The method of claim 1, wherein the orientation and position information comprises pitch, yaw, roll angle, acceleration, and elevation of a head of the head of the listener.

14. The method of claim 1, wherein the orientation and position information is provided by an inertial measurement unit (IMU) coupled to headtracking headphones.

15. The method of claim 1, wherein the output audio stream is a biphonic audio mix.

16. The method of claim 1, further comprising:

calculating coefficients based on the angles of the orientation and position information of the head of the listener; and multiplying the one or more audio channel streams by the coefficients based on the movement of the head of the listener.

17. The method of claim 16, wherein the angles are calculated from horizontal/yaw movement of the head of the listener.

18. The method of claim 16, wherein the angles are calculated from horizontal/yaw, vertical/pitch, and tilt/roll movements of the head of the listener.

19. The method of claim 1, wherein the modeling space comprises a three-dimensional (3D) cube.

20. The method of claim 1, wherein the modeling space can be extended by adding any number of emitters to the modeling space as vector points or vertices.

* * * * *